(12) United States Patent
Xue et al.

(10) Patent No.: US 11,470,642 B2
(45) Date of Patent: Oct. 11, 2022

(54) CHANNEL ACCESS WITH VARIABLE ENERGY DETECTION THRESHOLDS

(71) Applicant: QUALCOMM INCORPORATED, San Diego, CA (US)

(72) Inventors: Yisheng Xue, San Diego, CA (US); Aleksandar Damnjanovic, Del Mar, CA (US); Xiaoxia Zhang, San Diego, CA (US); Chih-Hao Liu, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/301,028

(22) Filed: Mar. 22, 2021

(65) Prior Publication Data
US 2021/0307065 A1    Sep. 30, 2021

Related U.S. Application Data

(60) Provisional application No. 63/001,130, filed on Mar. 27, 2020.

(51) Int. Cl.
| | |
|---|---|
| *H04W 74/08* | (2009.01) |
| *H04W 52/36* | (2009.01) |
| *H04W 16/14* | (2009.01) |
| *H04W 56/00* | (2009.01) |

(52) U.S. Cl.
CPC ....... *H04W 74/0808* (2013.01); *H04W 16/14* (2013.01); *H04W 52/36* (2013.01); *H04W 56/001* (2013.01)

(58) Field of Classification Search
CPC .............................. H04W 52/14; H04W 16/36
See application file for complete search history.

(56) References Cited

U.S. PATENT DOCUMENTS

2021/0378011 A1\*  12/2021  Luo ................... H04W 72/0426

\* cited by examiner

*Primary Examiner* — Sulaiman Nooristany
(74) *Attorney, Agent, or Firm* — Haynes and Boone, LLP

(57) ABSTRACT

Wireless communications systems and methods related to channel access with variable energy detection thresholds in a shared radio frequency band are provided. A wireless communication device, performs a listen-before-talk (LBT) procedure to contend for a maximum channel occupancy time (MCOT) in a first shared radio frequency band, the performing the LBT including performing, in the first shared radio frequency band, first channel sensing during a first portion of an LBT period based on a first energy detection threshold; and performing, in the first shared radio frequency band based on the first channel sensing, second channel sensing during a second portion of the LBT period based on a second energy detection threshold different from the first energy detection threshold; and communicating, in the first shared radio frequency band, a communication signal during the MCOT based on the LBT procedure.

35 Claims, 12 Drawing Sheets

CHANNEL ACCESS WITH VARIABLE ENERGY DETECTION THRESHOLDS

CROSS REFERENCE TO RELATED APPLICATIONS

The present application claims priority to and the benefit of U.S. Provisional Patent Application No. 63/001,130, filed Mar. 27, 2020, which is hereby incorporated by reference in its entirety as if fully set forth below and for all applicable purposes.

TECHNICAL FIELD

This application relates to wireless communication systems, and more particularly to channel access with variable energy detection thresholds in a shared radio frequency band (e.g., in a shared spectrum or an unlicensed spectrum).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel If the LBT results in an LBT pass, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a wireless communication device, includes performing a listen-before-talk (LBT) procedure to contend for a maximum channel occupancy time (MCOT) in a first shared radio frequency band, the performing the LBT including performing, in the first shared radio frequency band, first channel sensing during a first portion of an LBT period based on a first energy detection threshold; and performing, in the first shared radio frequency band based on the first channel sensing, second channel sensing during a second portion of the LBT period based on a second energy detection threshold different from the first energy detection threshold; and communicating, in the first shared radio frequency band, a communication signal during the MCOT based on the LBT procedure.

In an additional aspect of the disclosure, an apparatus includes a processor configured to perform a listen-before-talk (LBT) procedure to contend for a maximum channel occupancy time (MCOT) in a first shared radio frequency band, the processor configured to perform the LBT procedure is configured to perform, in the first shared radio frequency band, first channel sensing during a first portion of an LBT period based on a first energy detection threshold; and perform, in the first shared radio frequency band based on the first channel sensing, second channel sensing during a second portion of the LBT period based on a second energy detection threshold different from the first energy detection threshold; and a transceiver configured to communicate, in the first shared radio frequency band, a communication signal during the MCOT based on the LBT procedure.

In an additional aspect of the disclosure, a non-transitory computer-readable medium having program code recorded thereon, the program code includes code for causing a wireless communication device to perform a listen-before-talk (LBT) procedure to contend for a maximum channel occupancy time (MCOT) in a first shared radio frequency band, the code for causing the wireless communication device to perform the LBT procedure is configured to perform, in the first shared radio frequency band, first channel sensing during a first portion of an LBT period based on a first energy detection threshold; and perform, in the first shared radio frequency band based on the first channel sensing, second channel sensing during a second portion of the LBT period based on a second energy detection threshold different from the first energy detection threshold; and code for causing the wireless communication device to communicate, in the first shared radio frequency band, a communication signal during the MCOT based on the LBT procedure.

In an additional aspect of the disclosure, an apparatus includes means for performing a listen-before-talk (LBT) procedure to contend for a maximum channel occupancy time (MCOT) in a first shared radio frequency band, the means for performing the LBT procedure is configured to perform, in the first shared radio frequency band, first channel sensing during a first portion of an LBT period based on a first energy detection threshold; and perform, in the first shared radio frequency band based on the first channel sensing, second channel sensing during a second portion of the LBT period based on a second energy detection threshold different from the first energy detection threshold; and means for communicating, in the first shared radio frequency band, a communication signal during the MCOT based on the LBT procedure.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
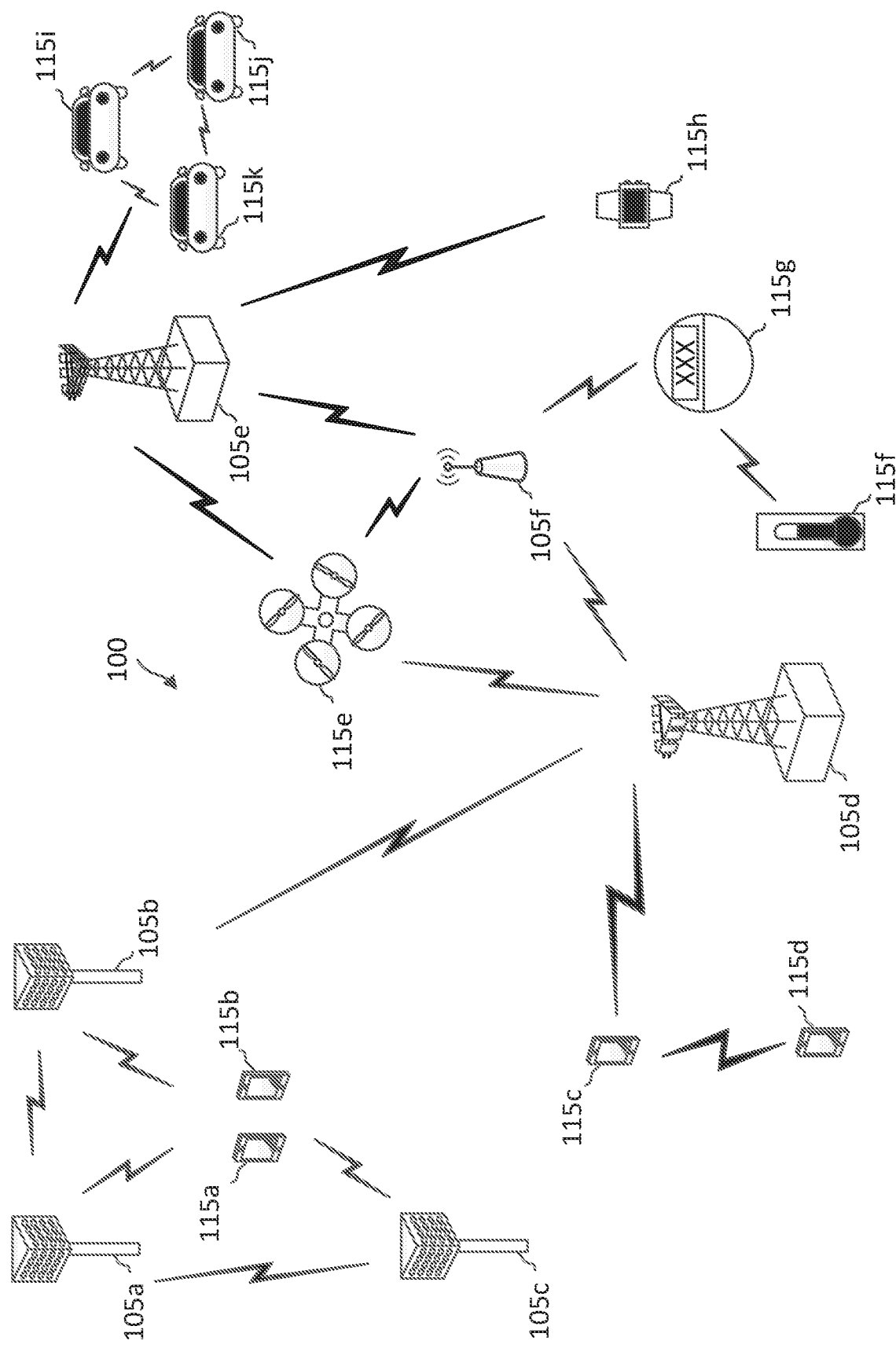
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating listen-berfore-talk (LBT)-based channel access in 6 GHz unlicensed band for wireless communications. The addition of 6 gigahertz (GHz) bands allows for hundreds of megahertz (MHz) of bandwidth (BW) available for unlicensed band communications. Some studies have been conducted for deployments of NR-U and IEEE 802.11 wireless local area network (WLAN) or WiFi over 6 GHz bands. For instance, WiFi may reuse the channel access scheme designed for 5 GHz band. In the channel access scheme for the 5 GHz band, WiFi utilizes a channelization of 20 MHz with a constant energy detection (ED) threshold of about −62 decibel-milliwatts (dBm) and a preamble detection (PD) threshold of about −82 dBm based on a transmission power of about 23 dBm in a 20 MHz band. The ED threshold can be applied to a channel signal measurement to determine whether the channel is occupied or available for transmission. The PD threshold can be applied to a signal correlator to determine whether a preamble is presence in the channel or not. NR-U may also use a channelization of about 20 MHz for channel access. For the sake of fair coexistence with WiFi, NR-U may utilize a ED threshold of about −72 dBm (based on a transmission power of about 23 dBm in a 20 MHz band). However, when a channel is heavily utilized (e.g., under a high traffic loading), the WiFi PD may not perform well. Thus, WiFi devices may effectively be utilizing the −62 dBm ED threshold for channel access, while NR-U devices utilize the −72 dBm ED threshold for channel access. The mismatch of ED thresholds between WiFi devices and NR-U devices may cause un-fairness in channel access between WiFi devices and NR-U devices. For instance, WiFi devices may have a greater chance of gaining access to the channel with the higher ED threshold, while NR-U devices may be starved of access to the channel with the lower ED threshold.

The present application describes mechanisms for improving channel access (e.g., fairness of coexistence) in a shared radio frequency band (e.g., in a shared spectrum or an unlicensed spectrum) by performing an LBT with variable ED thresholds. In some aspects, the shared radio frequency band may be a 6 GHz band. In some aspects, a wireless communication device may perform an LBT procedure to contend for a channel occupancy time (COT) in the shared radio frequency band. The LBT procedure may include various stages of channel sensing that are based on energy detection (e.g., measuring a signal energy in the channel). The LBT procedure may include a search for a channel idle period followed by a random backoff or countdown. The channel idle period may be referred to as a distributed coordination function interframe spacing (DIFS). To perform the LBT procedure, the wireless communication device may perform first channel sensing in the shared radio frequency band during a first portion of an LBT period based on a first energy detection threshold to search for a DIFS. Upon identifying a DIFS, the wireless communication device may perform second channel sensing (e.g., the random backoff) during a second portion of the LBT period based on a second energy detection threshold different from the first energy detection threshold. The wireless communication device may apply a more conservative ED threshold (e.g., a lower threshold) for the first ED threshold used for the DIFS search and apply a more aggressive ED threshold (e.g., a higher threshold) for second ED threshold used for the random backoff. In some instances, the first ED threshold may be about −72 dBm and the second ED threshold may be about −62 dBm.

In some aspects, the wireless communication device may determine whether to apply the more aggressive second ED threshold for the random backoff based on whether an additional backoff is applied for the LBT procedure. In some aspects, the wireless communication device may consider that the LBT procedure includes an additional backoff when the wireless communication device also performs a PD during the channel sensing.

In some aspects, the wireless communication device may consider that the LBT procedure includes an additional backoff when the wireless communication device performs the channel sensing in a synchronous channel access mode. A synchronous channel access may be based on predetermined synchronization periods (e.g. about 6 μs) or synchronization reference boundaries. All nodes participating in the synchronous channel access may be synchronized to the synchronization reference boundaries. In some aspects, the synchronization period may include a DIFS of a certain duration (e.g., about 43 μs) followed by a random backoff or countdown period, which may vary depending on a selected random value. The synchronous channel access may limit a contention window (CW) size for the random backoff to be within a certain value range (e.g., between 16 and 64). The wireless communication device may check out a COT at the end of the countdown period. The maximum COT (MCOT) is to be within the synchronization period. In other words, the MCOT may end at the same time as the end of the synchronization period before the start of a next synchronization period (where a next DIFS or "quite time" may begin). Thus, the MCOT may have a duration corresponding to remaining duration in the synchronization after the countdown period.

In some aspects, the wireless communication device may consider that the LBT procedure includes an additional backoff when the wireless communication device performs the channel sensing based on a cooperative asynchronous access. For instance, the wireless communication device may operate in an asynchronous channel access mode, but may cooperate with a near-by node operating in a synchronous channel access mode. For instance, the wireless communication may determine a synchronization period of the near-by synchronous channel access based on a detected DIFS and may limit a MCOT duration to end at the same time as the end of the synchronization period.

In some aspects, the wireless communication device may be a BS operating in a synchronous channel access mode. The BS may coordinate with a neighboring synchronous BS to apply coordinated multipoint (CoMP) for channel access. When a shared channel is heavily used with a high traffic loading, two synchronous BSs may identify DIFS at the same time and may each separately perform a random backoff after identifying the DIFS. Upon completing the random backoff, the BS may check out a MCOT. For example, the BS may complete the random backoff before the neighboring cooperating BS. The BS may transmit a coordination information message to the neighboring cooperating BS over-the-air (OTA) at the start of the MCOT. The coordination information message may include parameters (e.g., a spatial layer indication and/or transmission power) related to transmissions in the MCOT. The BS may transmit the OTA coordination information signal using a low power and may subsequently transmit data to its serving UEs during the COT using a full power. The BS may select the low power such that the OTA coordination information transmission may not block the LBT at the neighboring cooperating BS, but can be received by the neighboring cooperating BS.

Aspects of the present disclosure can provide several benefits. For example, the utilization of two ED thresholds for LBT instead of a constant ED threshold can provide a more a fair-coexistence with other wireless technologies (e.g., between WiFi and NR-U). The cooperative asynchronous channel access can allow a synchronous network and an asynchronous network to coexist and leverage or balance benefits from the inter-technology synchronization. The synchronization to the synchronous channel access channel access can also allow for a tighter intra-technology spatial reuse in the asynchronous network. The OTA inter-BS coordination information communication can allow for a tighter spatial reuse. While the present disclosure is described in the context of utilizing two different ED thresholds for LBT, similar techniques can be applied to utilize a greater number of ED thresholds for LBT. Additionally, the present disclosure can be applied any suitable wireless technologies, such as NR-U and WiFi.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to as no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may operate over a shared radio frequency band (e.g., in a shared spectrum or an unlicensed spectrum). In some instance, the shared radio frequency band may be a 6 GHz band. The shared radio frequency band may be shared by multiple wireless access technologies (e.g., WiFi and NR-U). The BSs 105 and/or the UEs 115 may perform channel access in the shared radio frequency band by applying a CAT4-based LBT as shown in FIG. 2

Figure 2:
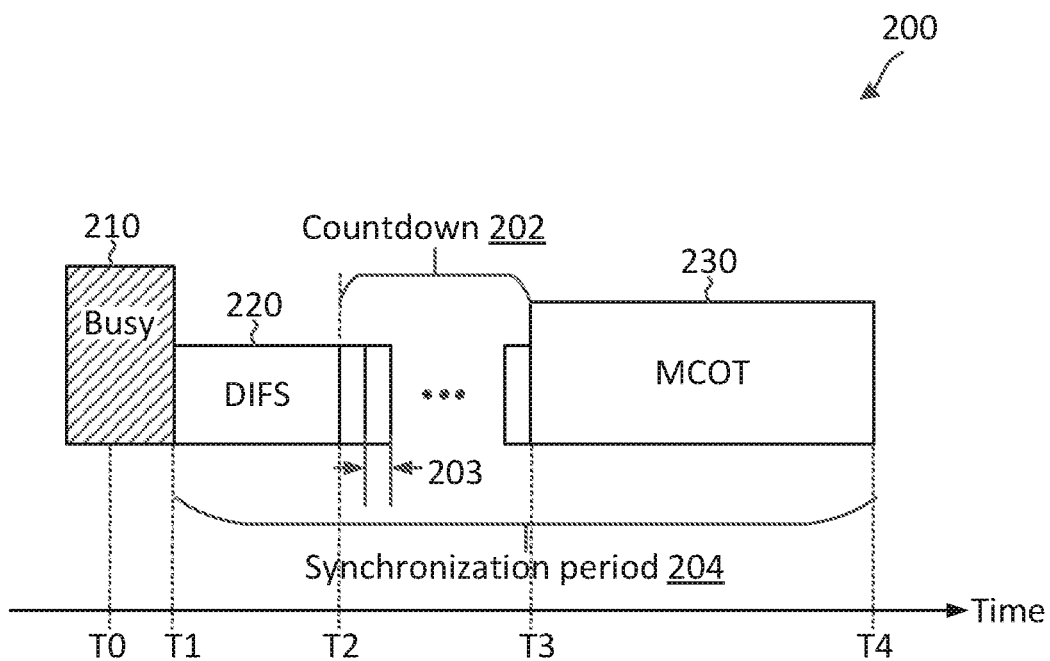
FIG. 2 illustrates a channel access scheme according to some aspects of the present disclosure.

FIG. 2 illustrates a channel access scheme 200 according to some aspects of the present disclosure. The scheme 200 may be employed by BSs such as the BSs 105 and UEs such as the UEs 115 in a network such as the network 100. In particular, a BS and/or a UE may perform channel access in a shared radio frequency band (e.g., in a shared spectrum or an unlicensed spectrum) as shown in the scheme 200. In FIG. 2, the x-axis represents time in some arbitrary units.

In the scheme 200, a BS (e.g., the BSs 105) may perform a CAT4-based LBT procedure to access a shared channel, for example, in a shared spectrum or an unlicensed spectrum such as a 6 GHz band. The LBT procedure may include various stages of channel sensing. The channel sensing can be based on a ED threshold. A channel is determined to be busy or occupied when a sensing node (e.g., a BS 105 or a UE 115) detected a channel measurement (e.g., a receive signal power) exceeding a ED threshold. A channel is determined to be free or idle when the sensing node detected a channel measurement below a ED threshold. In some aspects, the LBT procedure may include a search for a channel idle period followed by a random backoff. In some instances, the channel idle period may be referred to as a DIFS. A certain channel access protocol may restrict transmissions in the shared channel to be spaced apart by at least a certain amount of silence or idle periods corresponding to the DIFS.

For instance, a node may listen to the channel to detect for transmission in the channel If the channel is sensed to be busy, the node may wait till the ongoing transmission is completed. If the channel is detected to be idle or free for a DIFS period, the node may begin a random backoff procedure. In the backoff procedure, the node may select a random number from a CW. For instance, if the CW is between 16 and 64, the node may randomly select a value between 16 and 64. The random number may be in any suitable time units (e.g., transmission slots). The node may begin a countdown process, for example, by decrementing a backoff counter for each time unit that the channel is sensed to be idle. If the node detected a channel busy status during the countdown or random backoff, the node may suspend the backoff counter or countdown. The node may wait until the detected transmission is completed and the channel is sensed to be idle for a DIFS period and then resume the backoff counter or countdown. When the backoff interval expires (e.g., the backoff counter reaching a value of 0), the node may begin its transmission in the channel In the illustrated example of FIG. 2, the BS starts to perform an LBT starting at time T0. The LBT may include performing channel sensing to search for a channel idle period or DIFS. The BS may detect an ongoing transmission 210 in the channel, for example, based on a channel measurement exceeding a ED threshold. The BS may continue the sensing to wait for the ongoing transmission 210 to be completed. At time T1, the BS determines that the channel is idle, for example, based on a channel measurement being below a ED threshold. The BS may determine that the channel is idle for a DIFS period 220 based on the sensing. At time T2, after identifying the DIFS period 220, the BS begins a countdown. The BS may determine a countdown period 202 based on a random value selected from a CW. The selected value determines the number of countdown time units 203 in the countdown period 202. The BS may continue to sense the channel during the countdown. If the channel remains idle for the countdown period 202, the BS may gain access to the channel at the end of the countdown period 202 (e.g., at time T3). At time T3, the LBT procedure is completed and successful. The period between time T0 to T3 may be referred to as an LBT period. After a successful LBT, the BS may determine a MCOT 230 in the channel for communicating with one or more UEs (e.g., the UEs 115). The communications can include PDCCH signals (carrying DL control information), PDSCH signals (carrying DL data), PUSCH signals (carrying UL data), and/or PUCCH signals (carrying UL control information). While the channel sensing is discussed in relation to a BS accessing a channel, the UE may also apply similar channel sensing mechanisms for channel access.

In some aspects, the BS may determine a duration for the MCOT 230 based on a channel access priority or an LBT priority. Different channel access priorities or LBT priorities may be associated with different LBT parameters. For instances, different channel access priorities or LBT priorities may allow for different durations for the DIFS period 220, different CW sizes for the countdown, and/or different durations for the MCOT 230. In some instances, the different LBT parameters associated with the different priorities may be defined based on a certain regulation regulated channel access in a frequency spectrum and/or agreed by different wireless communication protocol standard bodies.

In some aspects, channel access can be synchronous among nodes sharing a channel For instance, in synchronous channel access, each node sharing the channel may be configured to maintain a MCOT of 6 ms or less. For strict synchronous access, the duration of a MCOT may be less than 6 ms. For instance, a synchronization period 204 may be defined for strict synchronous access. The synchronization period 204 may include a DIFS period 220, followed by a countdown period 202 and a MCOT 230. In some instances, a strict synchronous access may restrict the duration of a DIFS period 220 to be 43 microseconds (μs) and the size of the CW size to be between 16 and 64.

Since each node sharing a channel may maintain and synchronize to the synchronization period 204 for its transmission (e.g., ending its transmission before the start of a next synchronization period), a strict synchronous channel access may create periodic quiet or silence periods (e.g., the DIFS period 220) in the channel. As such, a substantially low ED threshold (e.g., close to a thermal noise floor of a node) can be used for searching for a DIFS period 220. In some aspects, a ED threshold of about −72 dBm may be used to achieve synchronous channel access.

As discussed above, WiFi devices may utilize a ED threshold of about −62 dBm and a PD threshold of about −82 dBm for channel sensing (to determine whether the channel is occupied or free), but the WiFi PD may not perform well at a high traffic load. As such, if an NR-U node (e.g., a BS 105 or a UE 115) utilizing a ED threshold of −72 dBm is to compete with WiFi devices for access in a shared channel, the NR-U node may be at a disadvantage due to the lower ED threshold. For instance, the lower ED threshold used by the NR-U node may cause the NR-U node to yield channel access to WiFi devices excessively, and thus may have a lower likelihood of gaining access to the channel compared to the WiFi devices.

Accordingly, the present application provides techniques for a wireless communication device (e.g., a BS 105 or a UE 115) to perform an LBT procedure with variable ED thresholds for a fair coexistence with other devices (e.g., WiFi devices) in a shared channel. For instance, a wireless communication device may utilize two ED thresholds for a CAT4-base LBT procedure. The wireless communication device may apply a more conservative ED threshold (e.g., a lower threshold) to search for a channel idle period (e.g., the DIFS period 220) and a more aggressive ED threshold (e.g., a higher threshold) for random backoff (e.g., the countdown period 202). The use of a more conservative or lower threshold for DIFS search and a more aggressive or higher threshold for the random backoff after identifying a DIFS can improve fairness in coexistence (e.g., between NR-U and WiFi). Additionally, various conditions may be applied to select and/or reconfigure ED thresholds in an LBT procedure. Mechanisms for performing channel access with variable ED thresholds are discussed in greater detail herein.

Figure 3:
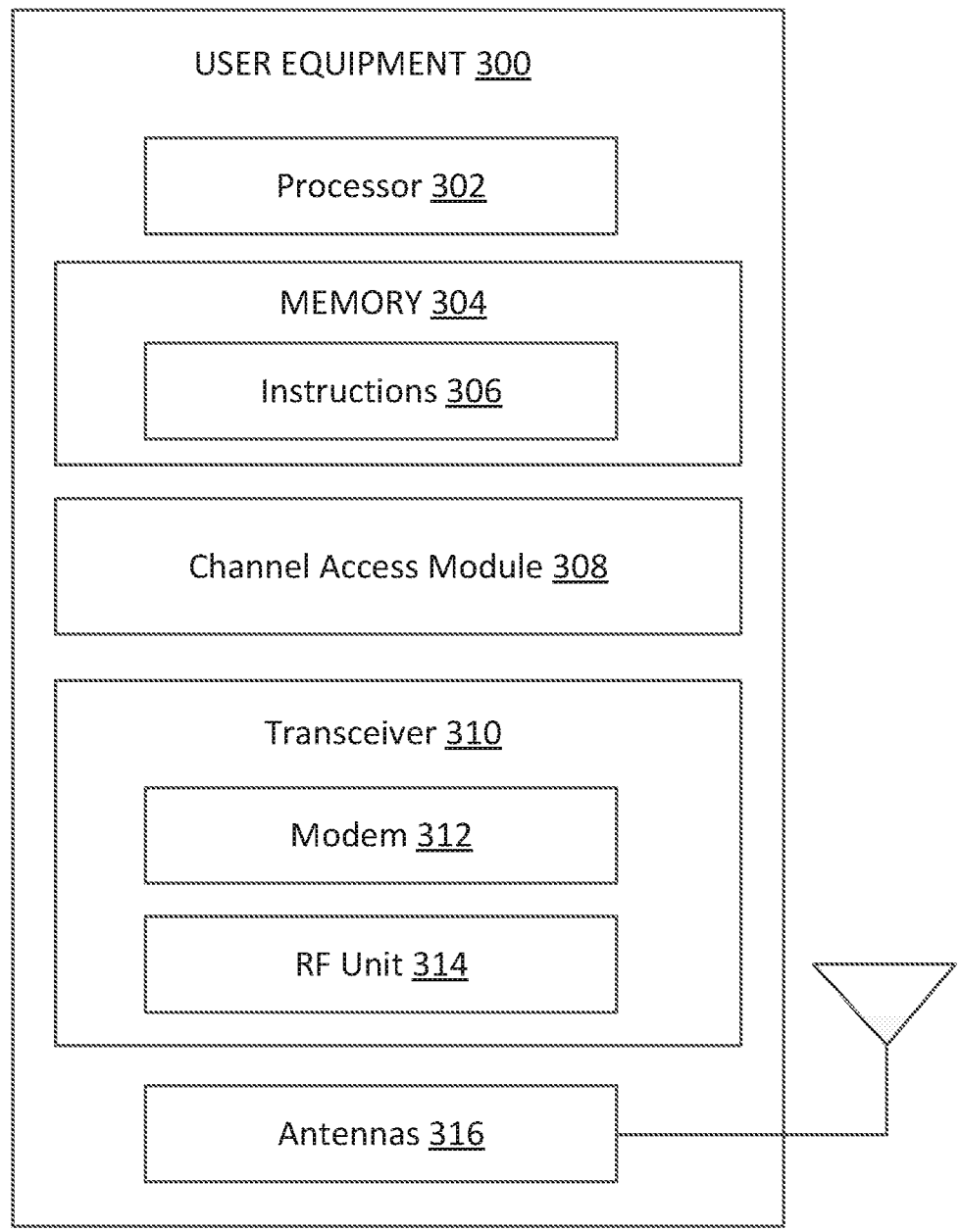
FIG. 3 is a block diagram of a user equipment (UE) according to some aspects of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a channel access module 308, a transceiver 310 including a modem subsystem 312 and a radio frequency (RF) unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 1-3, 5-10, and 13. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The channel access module 308 may be implemented via hardware, software, or combinations thereof. For example, the channel access module 308 may be implemented as a processor, circuit, and/or instructions 306 stored in the memory 304 and executed by the processor 302. In some instances, the channel access module 308 can be integrated within the modem subsystem 312. For example, the channel access module 308 can be implemented by a combination of software components (e.g., executed by a DSP or a general processor) and hardware components (e.g., logic gates and circuitry) within the modem subsystem 312.

The channel access module 308 may be used for various aspects of the present disclosure, for example, aspects of FIGS. 1-3, 5-10, and 13. For instance, the channel access module 308 is configured to perform an LBT procedure to contend for a MCOT in a shared frequency band. The channel access module 308 may be configured to perform the LBT procedure by performing first channel sensing in the shared radio frequency band during a first portion of an LBT period based on a first energy detection threshold to search for a DIFS. The channel access module 308 may be further configured to perform the LBT procedure by performing second channel sensing (e.g., the random backoff) during a second portion of the LBT period based on a second energy detection threshold upon identifying the DIFS. The first ED threshold may lower than the second ED threshold. In some instances, the first ED threshold may be about −72 dBm and the second ED threshold may be about −62 dBm.

In some aspects, the channel access module 308 may also be configured to determine whether to apply the higher second ED threshold for the random backoff based on whether an additional backoff is applied for the LBT procedure. The additional back off may be associated with a PD, a synchronous channel access, and/or a cooperative asynchronous channel access. For instance, the channel access module 308 may be configured to perform an additional backoff by performing a PD during the first channel sensing and/or the second channel sensing.

In some instances, the channel access module 308 may be configured to perform an additional backoff by performing the channel sensing in a synchronous channel access mode, which may define synchronization period or synchronization boundaries. The channel access module 308 may also be configured to determine an upper bound (e.g., end time) for a MCOT duration based on the synchronization boundaries.

In some aspects, the channel access module 308 may be configured to perform the additional backoff by performing the channel sensing based on a cooperative asynchronous access. For instance, the channel access module 308 may also be configured to determine a synchronization period or synchronization boundaries of the near-by synchronous channel access based on a detected DIFS and may limit an upper bound (e.g., the end time) of a MCOT according to the synchronization boundaries. Mechanisms for performing channel access with variable ED thresholds are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the channel access module 308 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 314 may be configured to process (e.g., perform analog to digital conversion or digital to analog conversion, etc.) modulated/encoded data (e.g., PUSCH, PUCCH) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., RRC configuration, PDSCH, PDCCH) to the channel access module 308 for processing. The antennas 316 may include multiple antennas of similar or different designs in order to sustain multiple transmission links. The RF unit 314 may configure the antennas 316.

In some aspects, the processor 302 is configured to coordinate with the channel access module 308 and/or the transceiver 310 to perform an LBT procedure to contend for a MCOT in a shared radio frequency band by performing first channel sensing during a first portion of an LBT period based on a first energy detection threshold and performing second channel sensing during a second portion of the LBT period based on a second energy detection threshold different from the first energy detection threshold. The transceiver 310 is configured to coordinate with the channel access module 308 to communicate a communication signal (e.g., PDSCH, PDCCH, PUSCH, and/or PUCCH) during the MCOT based on the LBT procedure.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
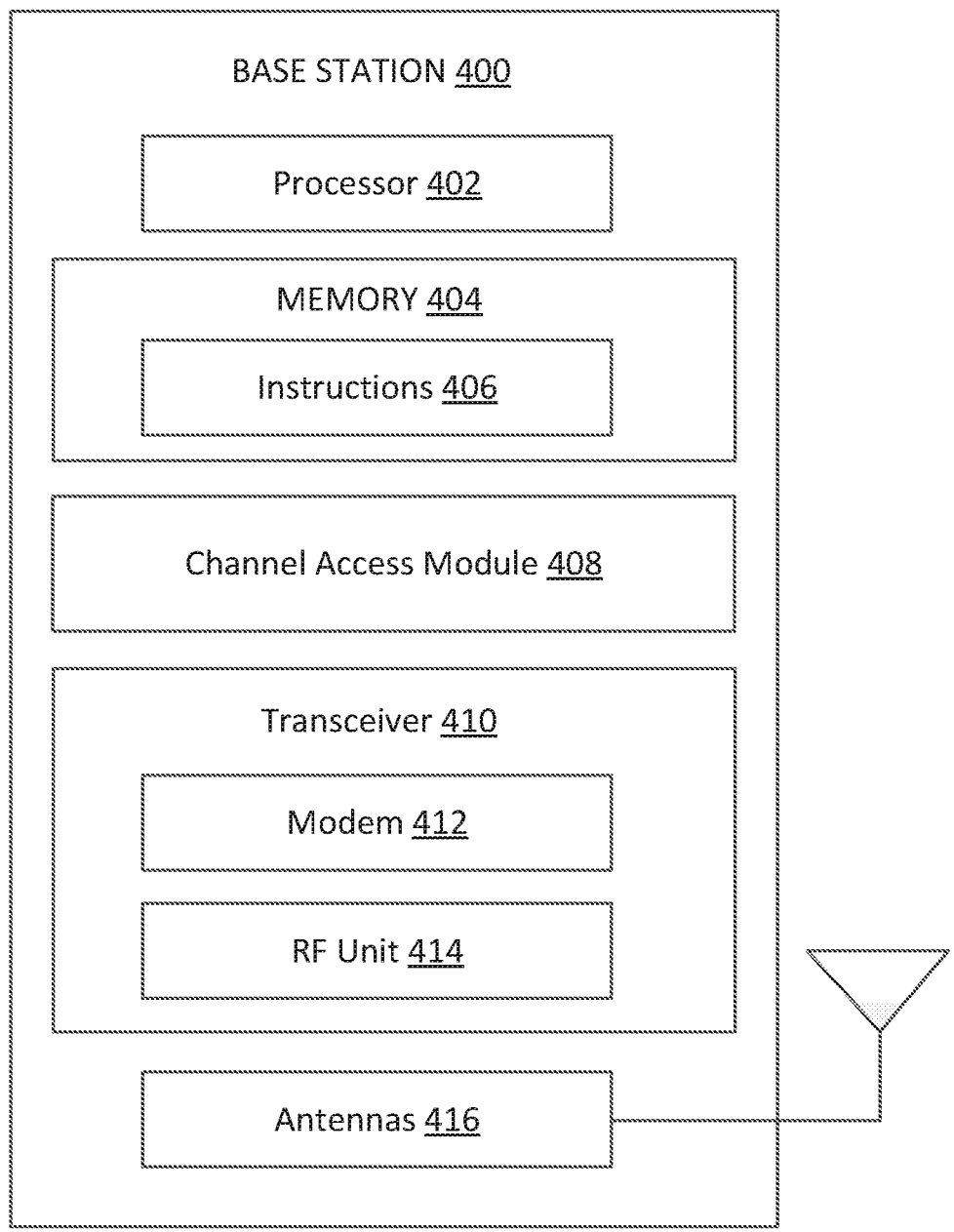
FIG. 4 is a block diagram of an exemplary base station (BS) according to some aspects of the present disclosure.

FIG. 4 is a block diagram of an exemplary BS 400 according to some aspects of the present disclosure. The BS 400 may be a BS 105 in the network 100 as discussed above in FIG. 1. As shown, the BS 400 may include a processor 402, a memory 404, a channel access module 408, a transceiver 410 including a modem subsystem 412 and a RF unit 414, and one or more antennas 416. These elements may be coupled with one another. The term "coupled" may refer to directly or indirectly coupled or connected to one or more intervening elements. For instance, these elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. FIGS. 1-3 and 5-13. Instructions 406 may also be referred to as code, which may be interpreted broadly to include any type of computer-readable statement(s) as discussed above with respect to FIG. 3.

The channel access module 408 may be implemented via hardware, software, or combinations thereof. For example, the channel access module 408 may be implemented as a processor, circuit, and/or instructions 406 stored in the memory 404 and executed by the processor 402. In some instances, the channel access module 408 can be integrated within the modem subsystem 412. For example, the channel access module 408 can be implemented by a combination of software components (e.g., executed by a DSP or a general processor) and hardware components (e.g., logic gates and circuitry) within the modem subsystem 412.

The channel access module 408 may be used for various aspects of the present disclosure, for example, aspects of FIGS. 1-3 and 5-13. For instance, the channel access module 408 is configured to perform an LBT procedure to contend for a MCOT in a shared frequency band. The channel access module 408 may be configured to perform the LBT procedure by performing first channel sensing in the shared radio frequency band during a first portion of an LBT period based on a first energy detection threshold to search for a DIFS. The channel access module 408 may be further configured to perform the LBT procedure by performing second channel sensing (e.g., the random backoff) during a second portion of the LBT period based on a second energy detection threshold upon identifying the DIFS. The first ED threshold may lower than the second ED threshold. In some instances, the first ED threshold may be about −72 dBm and the second ED threshold may be about −62 dBm.

In some aspects, the channel access module 408 may also be configured to determine whether to apply the higher second ED threshold for the random backoff based on whether an additional backoff is applied for the LBT procedure. The additional back off may be associated with a PD, a synchronous channel access, and/or a cooperative asynchronous channel access. For instance, the channel access module 408 may be configured to perform an additional backoff by performing a PD during the first channel sensing and/or the second channel sensing.

In some instances, the channel access module 408 may be configured to perform an additional backoff by performing the channel sensing in a synchronous channel access mode, which may define synchronization period or synchronization boundaries. The channel access module 408 may also be configured to determine an upper bound (e.g., end time) for a MCOT duration based on the synchronization boundaries.

In some aspects, the channel access module 408 may be configured to perform the additional backoff by performing the channel sensing based on a cooperative asynchronous access. For instance, the channel access module 408 may also be configured to determine a synchronization period or synchronization boundaries of the near-by synchronous channel access based on a detected DIFS and may limit an upper bound (e.g., the end time) of a MCOT according to the synchronization boundaries.

In some aspects, the BS 400 may be in coordination with another BS for CoMP. For instance, the channel access module 408 may be configured to perform channel access in a synchronous channel access mode, transmit an OTA coordination information message to the coordinating BS upon checking a MCOT, and subsequently communicate data signals with UEs (e.g., the UEs 115 and/or 300) served by the BS 400. The OTA coordination information message may include parameters, such as a spatial layer indication and/or transmission power related to transmissions in the MCOT. The channel access module 408 may configure the transceiver 410 to utilize a low transmit power for the OTA coordination information signal transmission and utilize a full power (e.g., at about 23 dBm) for the data communications with the UEs. Mechanisms for performing channel access with variable ED thresholds are described in greater detail herein.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., RRC configuration, PDSCH, PDCCH) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., PUSCH, PUCCH) to the channel access module 408 for processing. The antennas 416 may include multiple antennas of similar or different designs in order to sustain multiple transmission links.

In some aspects, the processor 402 is configured to coordinate with the channel access module 308 and/or the transceiver 410 to perform an LBT procedure to contend for a MCOT in a shared radio frequency band by performing first channel sensing during a first portion of an LBT period based on a first energy detection threshold and performing second channel sensing during a second portion of the LBT period based on a second energy detection threshold different from the first energy detection threshold. The transceiver 410 is configured to coordinate with the channel access module 408 to communicate a communication signal (e.g., PDSCH, PDCCH, PUSCH, and/or PUCCH) during the MCOT based on the LBT procedure.

In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
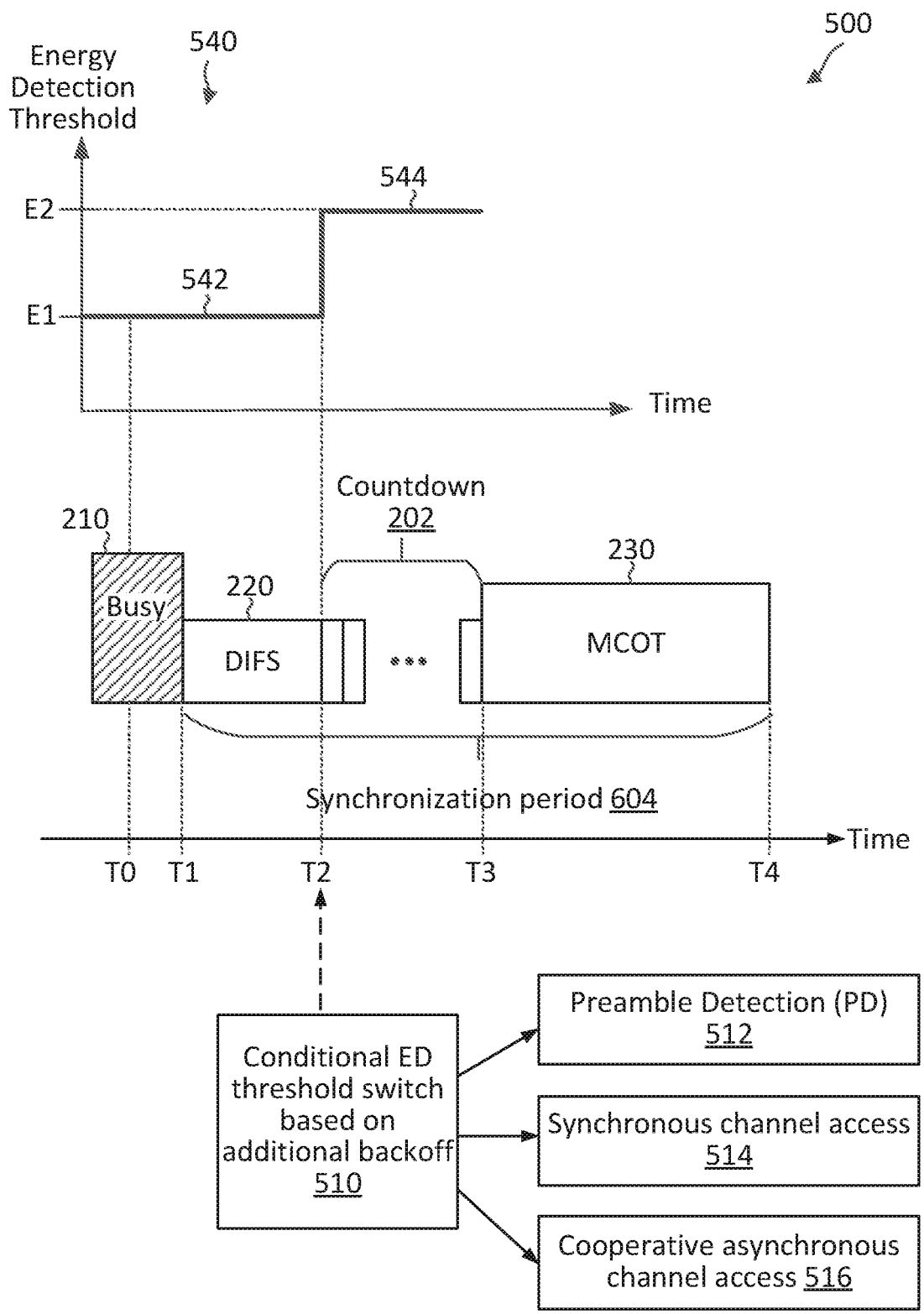
FIG. 5 illustrates a channel access scheme with variable energy detection thresholds according to some aspects of the present disclosure.

FIG. 5 illustrates a channel access scheme with variable energy detection thresholds according to some aspects of the present disclosure. The scheme 500 may be employed by BSs such as the BSs 105 and 400 and UEs such as the UEs 115 and 300 in a network such as the network 100. In particular, a BS and/or a UE may perform channel access as shown in the scheme 500. In FIG. 5, the x-axes represent time in some arbitrary units, and the y-axis represents ED thresholds in some arbitrary units. The scheme 500 is described using a similar channel access time frame as in the scheme 200 and may use the same reference numerals as in FIG. 2 for simplicity's sake.

In the scheme 500, a node (e.g., the BSs 105 and/or 400 and/or the UEs 115 and/or 300) may utilize two ED thresholds in a CAT4-based LBT procedure. The node may utilize a more conservative ED threshold (e.g., a lower threshold) to search for a channel idle period (e.g., the DIFS 220) and a more aggressive ED threshold (e.g., a higher threshold) for random backoff (e.g., the countdown period 202). The use of a more aggressive or higher threshold for the random backoff after identifying a DIFS can improve fairness in coexistence with WiFi devices.

As shown in the ED threshold profile 540, the node may apply a first ED threshold 542, denoted as E1, during the search for the DIFS period 220. The node may switch from the first ED threshold 542 to a second ED threshold 544, denoted as E2, after identifying the DIFS period 220. The first ED threshold 542 is lower than the second threshold 544. In other words, the node may be more conservative in determining whether the channel is idle or busy when searching for the DIFS period 220 and can be more relaxed or aggressive during the random backoff after identifying the DIFS period 220. In some aspects, the first ED threshold 542 may be about −62 dBm and the second ED threshold 544 may be about −72 dBm. The use of a more conservative or lower threshold for DIFS search and a more aggressive or higher threshold for the random backoff after identifying a DIFS can improve fairness in coexistence (e.g., between NR-U and WiFi).

In some aspects, the switch to the more relaxed or aggressive second ED threshold 544 for the random backoff may be conditional. For instance, the scheme 500 may allow a node to switch to the more relaxed second ED threshold 544 after identifying the DIFS period 220 when the node applies an additional backoff. Accordingly, the node may perform a conditional ED threshold switch based on an additional backoff 510 associated with the LBT procedure at time T2 after identifying the DIFS period 220. In some aspects, the LBT procedure is considered to have an additional backoff when the node performs a PD 512. In some aspects, the LBT procedure is considered to have an additional backoff when the node performs channel sensing based on a synchronous channel access 514. In some aspects, the LBT procedure is considered to have an additional backoff when the node performs channel sensing based on a cooperative asynchronous channel access 516.

In some aspects, the node may perform PD 512 in addition to energy detection during the LBT procedure. For instance, the node may perform the PD concurrent with the DIFS search and/or the random backoff. To perform PD, the node may receive a signal the from the channel and compute a cross-correlation between the received signal and a preamble (e.g., a predetermined sequence). If the cross-correlation is greater than the PD threshold, the node may determine that a preamble signal is detected from the channel. For instance, if a channel measurement during a DIFS search is below the first ED threshold 542, but the cross-correlation is above the PD threshold, the channel is considered to be busy. Similarly, if a channel measurement during a random backoff is below the second ED threshold 544, but the cross-correlation is above the PD threshold, the channel is considered to be busy. If the cross-correlation is below the PD threshold, the node may determine that no preamble signal is detected from the channel In some instances, the node may utilize one or more components, such as the processor 302 or 402, the channel access module 308 or 408, the transceiver 310 or 410, the modem 312 or 412, and/or the one or more antennas 316 or 416, to perform the PD 512.

In some aspects, the node may perform channel sensing based on the synchronous channel access 514 by performing a strict synchronous channel access. For example, the node may be operating in a synchronous channel access mode, where all nodes connected to the same network may be synchronized to the synchronization period 204. As discussed above, a strict synchronous access may restrict channel access to be aligned to a synchronization period 204 of about 6 ms with the duration of a DIFS period 220 to be 43 (µs) and the size of the CW size to be between 16 and 64, and the MCOT 230 to end at the same time as the end of the synchronization period 204. The synchronization period 204 may be aligned to synchronization reference boundaries defined based on a common clock, such as a universal coordinated time (UTC).

To perform the strict synchronous access, the node may search for a DIFS period 220 of about 43 µs in the channel. In other words, the node may determine that all channel measurements within the 43 µs DIFS period 220 are below the first ED threshold 542. Upon identifying the 43 µs DIFS period, node may select a random value between 16 and 64 and backoff for a countdown period 202 according the to the selected random value. If the node determines that all channel measurements within the countdown period 202 are below the second ED threshold 542, the node may transmit in the channel at the end of the countdown period 202. If the node detected a channel measurement above the first ED threshold 542 during the DIFS search or a channel measurement above the second ED threshold 544 during the random backoff, the node may repeat the DIFS search and random backoff as will be discussed more fully below. In some instances, the node may utilize one or more components, such as the processor 302 or 402, the channel access module 308 or 408, the transceiver 310 or 410, the modem 312 or 412, and/or the one or more antennas 316 or 416, to perform the synchronous channel access 514.

In some aspects, the node may perform channel sensing based on the cooperative synchronous channel access 516 by performing asynchronous channel access, but may determine the MCOT 230 based on a synchronization period 204 associated with a synchronous channel access. For example, the node may be operating in an asynchronous channel access mode, where all nodes connected to the same network may perform channel access without a synchronization reference timing. For instance, the node may determine a duration for the MCOT 230 based on an LBT priority used for winning the MCOT 230 in the channel.

To perform the cooperative asynchronous channel access 516, the node may determine a synchronization reference timing based on a start of the DIFS period 220. As shown, the synchronization period 204 starts at time T1, where the DIFS period 220 begins. The node may determine a duration for the MCOT 230 such that the MCOT 230 may end at the same time as the end of the synchronization period 204. In other words, the MCOT 230 may not extend beyond the synchronization period 204. The node may determine a shortened MCOT 230 duration based on the synchronization period 204 instead of determining the MCOT 230 duration based on a MCOT duration allowable by an LBT priority used for winning the MCOT 230. In some instances, the node may record the time instant, denoted as $T_{DIFS}$, when the DIFS period 220 is identified. When the node finally checks out a COT at a time instant, denoted as $T_{COTSTART}$ the node may determine a duration for the MCOT 230 in accordance with equation (1):

$$T_{COTSTART}-T_{DIFS}+\text{MCOT duration}=6 \text{ ms.} \quad (1)$$

In other words, the node may determine the duration of the MCOT 230 by subtracting the DIFS period 220 and the countdown period 202 from the synchronization period. In the example of FIG. 5, $T_{COTSTART}$ may correspond to T3 and $T_{DIFS}$ may correspond to T1. In some instances, the node may utilize one or more components, such as the processor 302 or 402, the channel access module 308 or 408, the transceiver 310 or 410, the modem 312 or 412, and/or the one or more antennas 316 or 416, to perform the cooperative asynchronous channel access 516.

The use of the cooperative asynchronous channel access 516 can allow an asynchronous node without a UTC to opportunistically synchronize to a nearby synchronous node. For instance, the preceding ongoing transmission 210 may be transmitted by a nearby synchronous node, and thus the asynchronous node may synchronize to the synchronization period 204 used by the synchronous node. By stopping or terminating the MCOT 230 before the next synchronization instant (e.g., the beginning of a next synchronization period 204), the asynchronous node can respect the synchronous access of a coexisting synchronous node, and thus may improve the overall spectrum sharing performance. For example, the cooperative asynchronous channel access 516 can be used to balance the benefit from inter-technology synchronization and tight intra-technology spatial reuse.

In some aspects, a node (e.g., the BSs 105 and/or 400 and/or the UEs 115 and/or 300) can perform on or more of the additional backoffs discussed above. In some aspects, the node may determine whether to apply an additional backoff to the LBT procedure based on a traffic priority of a communication signal to be communicated upon winning a COT (e.g., the MCOT 230). For instance, if the communication signal to be communicated in the MCOT 230 is of a high traffic priority, the node may determine to switch to the more aggressive second ED threshold 544 for the random backoff (e.g., during the countdown period 202) without based on having an additional backoff for the LBT. If the communication signal to be communicated in the MCOT 230 is of a low traffic priority, the node may determine to switch to the more aggressive second ED threshold 544 for the random backoff when an additional backoff is applied to the LBT. Otherwise, the node may not switch to the more aggressive second ED threshold 544 for the random backoff.

Figure 6:
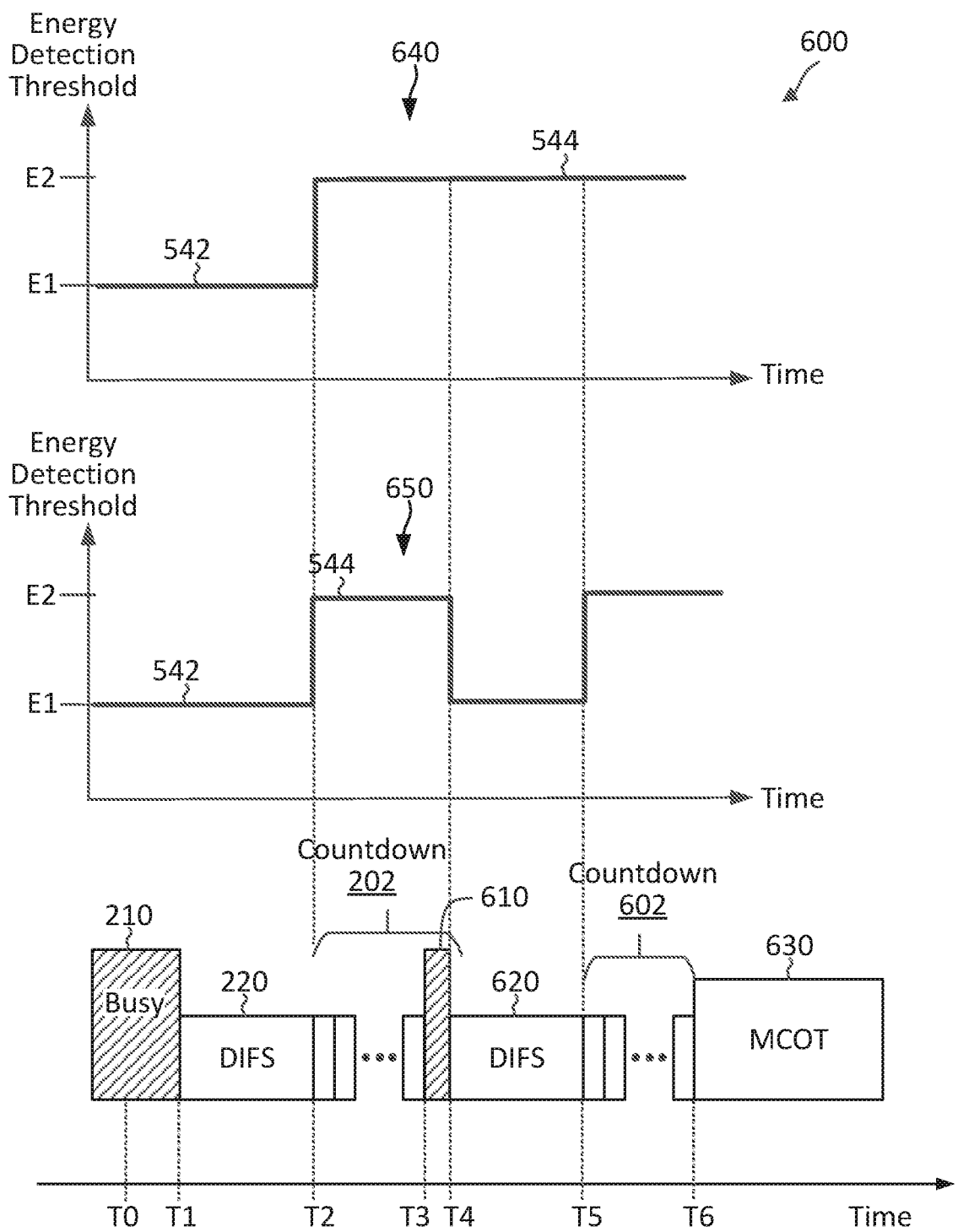
FIG. 6 illustrates a channel access scheme with variable energy detection thresholds according to some aspects of the present disclosure.

FIG. 6 illustrates a channel access scheme with variable energy detection thresholds according to some aspects of the present disclosure. The scheme 600 may be employed by BSs such as the BSs 105 and 400 and UEs such as the UEs 115 and 300 in a network such as the network 100. In particular, a BS and/or a UE may perform channel access as shown in the scheme 600. In FIG. 6, the x-axes represent time in some arbitrary units, and the y-axes represents ED thresholds in some arbitrary units. The scheme 600 is described using a similar channel access time frame as in the scheme 200 and similar ED thresholds as in the scheme 500 and may use the same reference numerals as in FIGS. 2 and 5 for simplicity's sake.

In the scheme 600, a node (e.g., the BSs 105 and/or 400 and/or the UEs 115 and/or 300) may utilize two ED thresholds in a CAT4-based LBT procedure similar to the scheme 500, but may additionally include rules for determining which ED threshold to apply upon detecting a channel busy status while counting down or random backoff. In the illustrated example of FIG. 6, while the node is counting down in the countdown period 202, the node detected a channel busy status (e.g., the transmission 610) at time T3. Upon detecting the channel busy status, the node may continue to sense the channel to search for a next DIFS period. After the transmission 610 is completed at time T4, the channel may become available again. At time T5, upon detecting a DIFS period 620, the node may perform a random backoff during a countdown period 602. If the channel remains idle during the countdown period 602, the node may start a MCOT 630 at the end of the countdown period 602 (e.g., at time T6).

In some instances, the node may select a first random value (e.g., a value R1) at time T2 for the countdown period 202. Upon detecting the transmission 610 at time T3, the node may suspend the countdown. For example, the countdown may reach a value R2 at time T3. At time T5, the node may resume the countdown. In other words, the node may configure the countdown period 602 based on the countdown value R2. In some instances, the node may repeat a similar DIFS search and random backoff upon detecting another channel busy status during the countdown period 602.

The scheme 600 may allow for three options in determining a ED threshold for the DIFS search upon detecting a channel busy status during a random backoff. In a first option, the node may switch from the second ED threshold 544 to the first ED threshold 542 upon detecting a channel busy status during a random backoff as shown in the ED threshold profile 650 to search for another DIFS. In other words, the node may utilize the first ED threshold 542 for DIFS search and the second ED threshold 544 for countdown.

In a second option, the node may continue to utilize the second ED threshold 544 if the node had performed a DIFS search using the first ED threshold 542 once in the LBT procedure as shown in the ED threshold profile 640. In other words, the node may utilize the second ED threshold 544 even when a busy channel status is detected during a backoff. As shown, the node utilizes the second ED threshold 544 to search for the DIFS period 620 after detecting the transmission 610 during the countdown period 202.

The third option may be substantially similar to the second option. For instance, the node may continue to utilize the second ED threshold 544 if the node had performed a DIFS search using the first ED threshold 542 once in the LBT procedure as shown in the profile 640. However, the node may be allowed to continue to utilize the second ED threshold 544 if the node determines channel measurements (e.g., clear channel assessment (CCA) levels) in previous DIFS periods (e.g., the DIFS period 220) are below a certain signal energy threshold. For instance, the node may receive a signal from the channel and perform a signal measurement (e.g., by computing a receive signal power) at the output of an ADC in a transceiver (e.g., the transceivers 310 and/or 410) of the node. In some instances, the signa energy threshold may be about −82 dBm or any suitable power level. If the node detected a channel measurement in a previous DIFS period exceeding the signal energy threshold, the node may switch back to the first ED threshold 542 for a subsequent DIFS search. The third option may be useful for incumbent detection. The node may apply the third option to avoid interfering with the incumbent.

In some aspects, the node may determine whether to apply the first option or the second option based on a channel access priority or an LBT priority used for performing the LBT procedure. An LBT priority may define LBT parameters for the LBT procedure. Some examples of LBT parameters may include a DIFS duration (e.g., the DIFS period 220 and/or 620), a CW size for a random backoff (e.g., the countdown periods 202 and 602), and/or a MCOT duration (e.g., the MCOTs 230 and 630). In some aspects, if the node performs the LBT procedure based on a first LBT priority, the node may apply the first option to utilize the first ED threshold 542 for all DIFS searches during the LBT procedure. If the node performs the LBT procedure based on a second LBT priority, the node may apply the second option to utilize the first ED threshold 542 for a first DIFS search in the LBT procedure and utilize the second ED threshold 544 for the remaining time of the LBT procedure. If the node performs the LBT procedure based on a third LBT priority, the node may apply the second option to utilize the first ED threshold 542 for a first DIFS search in the LBT procedure and utilize the second ED threshold 544 for the remaining time of the LBT procedure based on channel measurements in previous DIFS satisfying the signal energy threshold. In some instance, the first LBT priority may be a lowest LBT priority and the second LBT priority may be the highest LBT priority among the three LBT priorities.

As discussed above, an asynchronous node (e.g., the BSs 105 and/or 400 and/or the UEs 115 and/or 300) may perform a cooperative asynchronous channel access (e.g., the cooperative asynchronous channel access) to synchronize to a synchronization period (e.g., the synchronization period 204) of a nearby node or network performing synchronous channel access. FIGS. 7-10 illustrate various mechanisms for the asynchronous node to synchronize to a quite time or idle time (e.g., the DIFS 220 and/or 620) of a coexisting synchronous network.

Figure 7:
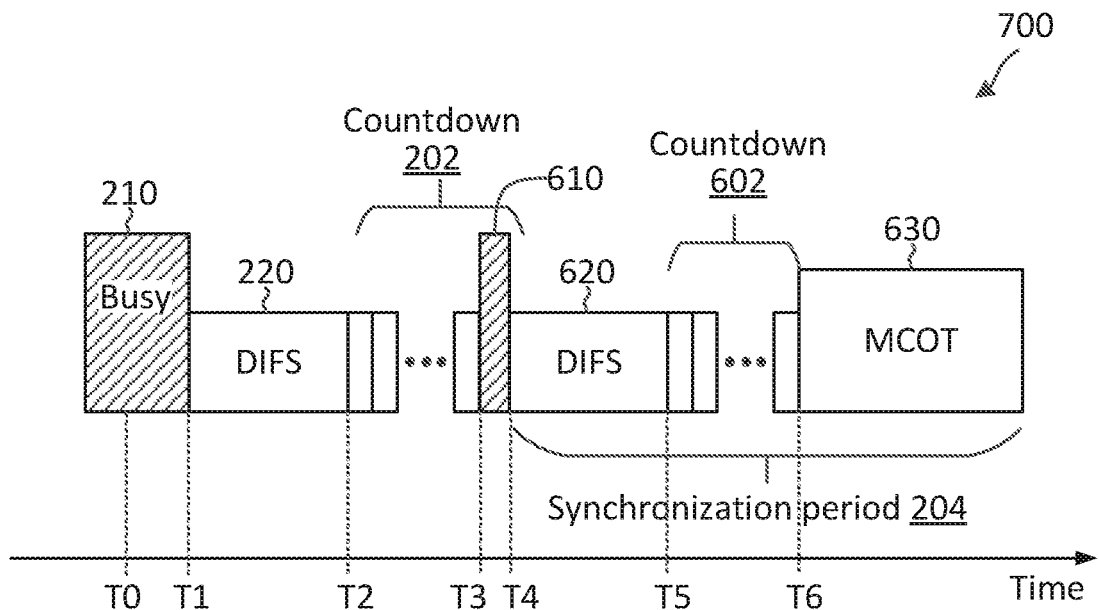
FIG. 7 illustrates a cooperative channel access scheme according to some aspects of the present disclosure.

FIG. 7 illustrates a cooperative asynchronous channel access scheme 700 according to some aspects of the present disclosure. The scheme 700 may be employed by BSs such as the BSs 105 and 400 and UEs such as the UEs 115 and 300 in a network such as the network 100. In particular, a BS and/or a UE may perform cooperative asynchronous channel access as shown in the scheme 700. In FIG. 7, the x-axis represents time in some arbitrary units. The scheme 700 is described using a similar channel access scenario as in the scheme 600 and may use the same reference numerals as in FIGS. 2, 5, and 6 for simplicity's sake.

In the scheme 700, an asynchronous node (e.g., the BSs 105 and/or 400 and/or the UEs 115 and/or 300) may determine a starting time or "sync instant" for a synchronization period of a nearby mode performing synchronous channel access based on a latest DIFS detected in an LBT procedure. The node may determine an upper bound for the MCOT 630 based on an end time of the synchronization period 204. As shown in FIG. 7, the node may subsequently detect a first DIFS period 220, encounter a channel busy status during the countdown 202, and search for another DIFS period (e.g., the DIFS period 620) followed by another countdown (e.g., the countdown period 602). The node may succeed in gaining access to the channel after the countdown period 602. Thus, the latest DIFS or the most recent DIFS corresponds to the DIFS period 602.

In some instances, the node may determine a synchronization period 204 (e.g., about 6 ms) associated with synchronous channel access with respect to the starting time of the latest DIFS 620 detected from the LBT procedure. The node may subsequently determine the MCOT 630 based on the synchronization period 204. For instance, the node may determine that a duration for the MCOT 630 such that the MCOT may end at the same time as the end of the synchronization period 204. In some instance, the node may update $T_{DIFS}$ upon identifying a DIFS 620 after a channel busy status. In some instances, the node may record the time T1 for $T_{DIFS}$ upon identifying the DIFS period 220. The node may update $T_{DIFS}$ to the time T4 upon identifying the DIFS period 620 after the channel busy status is detected at time T3. The node may determine the MCOT 630 duration as shown in Equation (1) discussed above.

Figure 8:
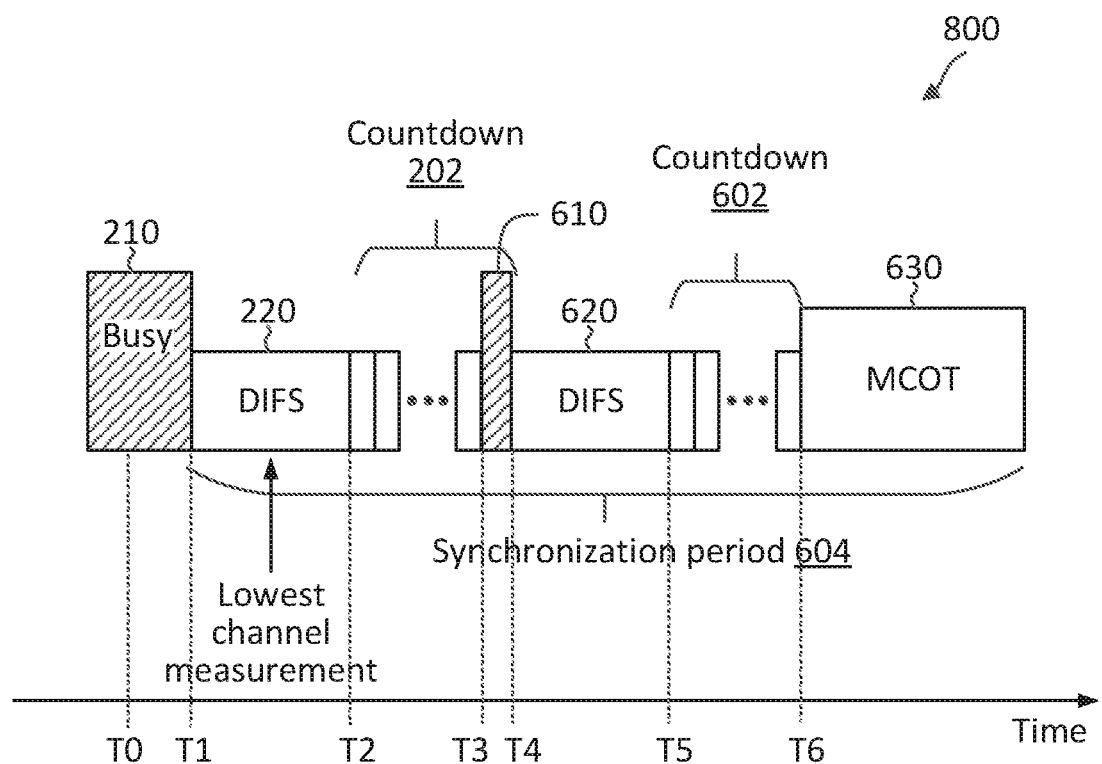
FIG. 8 illustrates a cooperative channel access scheme according to some aspects of the present disclosure.

FIG. 8 illustrates a cooperative asynchronous channel access scheme 800 according to some aspects of the present disclosure. The scheme 800 may be employed by BSs such as the BSs 105 and 400 and UEs such as the UEs 115 and 300 in a network such as the network 100. In particular, a BS and/or a UE may perform cooperative asynchronous channel access as shown in the scheme 800. In FIG. 8, the x-axis represent times in some arbitrary units. The scheme 800 is described using a substantially similar channel access scenario as in the scheme 600 and may use the same reference numerals as in FIGS. 2, 5, and 6 for simplicity's sake. However, in the scheme 800, an asynchronous node (e.g., the BSs 105 and/or 400 and/or the UEs 115 and/or 300) may determine a starting time or "sync instant" for a synchronization period of a nearby mode performing synchronous channel access based on a DIFS having a lowest channel measurement (e.g., CCA levels) in an LBT procedure. The node may subsequently determine an upper bound for the MCOT 630 based on an end time of the synchronization period 204.

As shown in FIG. 8, the node may detect a first DIFS period 220, encounter a channel busy status during the countdown 202, and search for another DIFS period (e.g., the DIFS period 620) followed by another countdown (e.g., the countdown period 602). The node may succeed in gaining access to the channel after the countdown period 602. The node may record channel measurements (e.g., received signa power) computed during each DIFS period (e.g., the DIFS 220 and 620) in the LBT procedure and record the starting time of the DIFS. The node may determine a starting time of a synchronization period 204 of a nearby node based on the starting time of a DIFS with the lowest channel measurement(s).

In some instances, the node may determine the synchronization period 204 with respect to the starting time (e.g., time T1) of the DIFS period 220 in response to a determination that a first channel measurement in the DIFS period 220 has a smaller signal value than a second channel measurement in the DIFS period 620 as shown in FIG. 8. Alternatively, the node may determine the synchronization period 204 with respect to the starting time (e.g., time T4) of the DIFS period 620 in response to a determination that a second channel measurement in the DIFS period 620 has a smaller signal value than a first channel measurement in the DIFS period 220. In some aspects, each of the first channel measurement and the second channel measurement may be an average channel measurement over a corresponding DIFS periods. In some aspects, each of the first channel measurement and the second channel measurement may be a maximum channel measurement over a corresponding DIFS periods. The node may subsequently determine the MCOT 630 based on the synchronization period 204. For instance, the node may determine that a duration for the MCOT 630 such that the MCOT 630 may end at the same time as the end of the synchronization period 204. The node may set $T_{DIFS}$ to the starting time of a DIFS period with the lowest channel measurements and determine the MCOT 630 duration as shown in Equation (1) discussed above.

Figure 9:
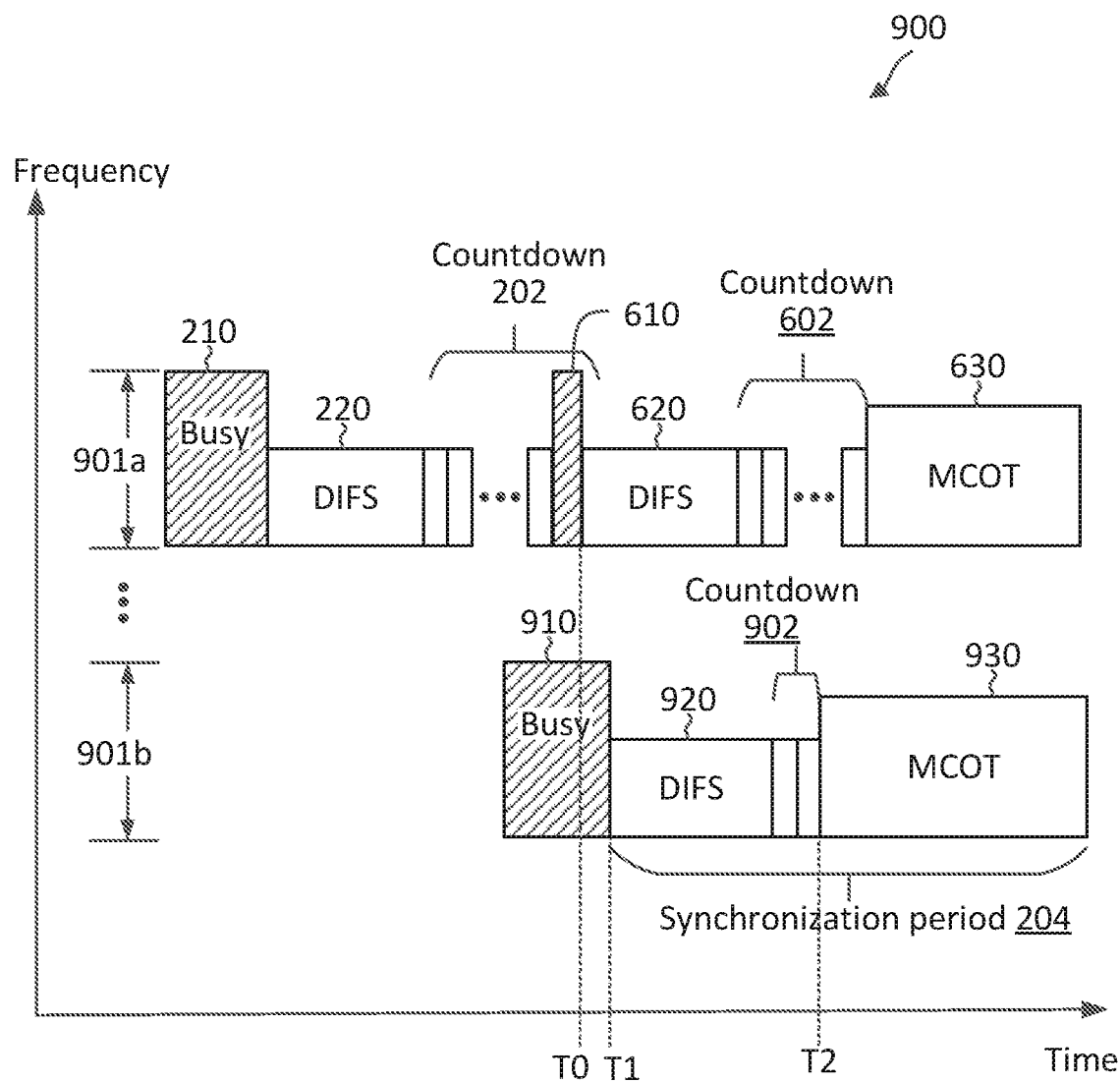
FIG. 9 illustrates a cooperative channel access scheme according to some aspects of the present disclosure.

FIG. 9 illustrates a cooperative asynchronous channel access scheme 900 according to some aspects of the present disclosure. The scheme 900 may be employed by BSs such as the BSs 105 and 400 and UEs such as the UEs 115 and 300 in a network such as the network 100. In particular, a BS and/or a UE may perform cooperative asynchronous channel access as shown in the scheme 900. In FIG. 9, the x-axis represents time in some arbitrary units, and the y-axis represents time some arbitrary units. In the scheme 900, channel access can be over two frequency bands 901 (shown as 901a and 901b). The frequency bands 901 may be at any suitable frequencies. In some aspects, the frequency bands 901 may be at 6 GHz. The frequency bands 901a and 901b can be non-contiguous in frequencies as shown or contiguous in frequencies. In some instances, the frequency bands 901 may be referred to as LBT subbands and may be within a BW of an operating carrier. While FIG. 9 is illustrated with two frequency bands 901, the scheme 900 can be applied to channel access with any suitable number of frequency bands (e.g., about 3, 4, or more).

In some aspects, an asynchronous node (e.g., the BSs 105 and/or 400 and/or the UEs 115 and/or 300) may perform multi-carrier channel sensing separately in the frequency band 901a and the frequency band 901b. However, the channel sensing in the frequency band 901a can be performed concurrently or simultaneously with the channel sensing in the frequency band 901b. The channel access in the frequency band 901a be substantially similar to the channel access scenario in the schemes 600. The scheme 900 may use the same reference numerals as in FIGS. 2, 5, and 6 for simplicity's sake. In the scheme 900, the node may determine a starting time or "sync instant" for a synchronization period of a nearby mode performing synchronous channel access based on a latest DIFS detected from the LBT in the frequency band 901a and the LBT in the frequency band 901b.

In the illustrated example of FIG. 9, in addition to channel sensing in the frequency band 901a, the node may perform channel sensing in the frequency band 901b using substantially similar mechanisms as discussed above with reference to FIGS. 5 and 6. For instance, the node may detect an ongoing transmission 910 in the frequency band 901*b*. The node may identify a DIFS period 920 beginning at time T1 after the ongoing transmission 910 is completed. The node may perform a random backoff during countdown period 902 after the DIFS period 920. If the channel (e.g., the frequency band 901*b*) remains free during the countdown period 902, the node may determine a MCOT in the frequency band 901*b* at the end of the countdown period 902 (e.g., at time T2). The node may determine that the DIFS period 920 in the frequency band 901*b* starting at time T1 is later than the DIFS period 620 in the frequency band 901*a* starting at time T0. Thus, the node may determine a starting time for the synchronization period 204 (e.g., about 6 ms) based on the starting time of the DIFS period 920 in the frequency band 901*b*.

In some instances, the node may determine the synchronization period 204 with respect to the starting time (e.g., time T1) of the DIFS period 920 in response to a determination that the starting time of the DIFS period 920 is later than the starting time (e.g., time T0) of the DIFS period 620 as shown in FIG. 9. Alternatively, the node may determine the synchronization period 204 with respect to the starting time (e.g., time T0) of the DIFS period 620 in response to a determination that the starting time of the DIFS period 620 is later than the starting time of the DIFS period 620. The node may subsequently determine the MCOT 930 in the frequency band 901*b* based on the synchronization period 204. For instance, the node may determine a duration for the MCOT 930 in the frequency band 901*b* such that the MCOT 930 may end at the same time as the end of the synchronization period 204. Similarly, the node may determine that a duration for the MCOT 630 in the frequency band 901*a* may end at the same time as the end of the synchronization period 204. In other words, the MCOT 630 in the frequency band 901*a* and the MCOT 930 in the frequency band 901*b* may both be shortened (from a MCOT duration allowed for corresponding LBT priorities) in order to end before the next "sync instant" (e.g., the beginning of a next synchronization period 204). The node may set $T_{DIFS}$ to the starting time of a latest DIFS period detected among the frequency bands 901 and determine the MCOT 630 duration as shown in Equation (1) discussed above.

Figure 10:
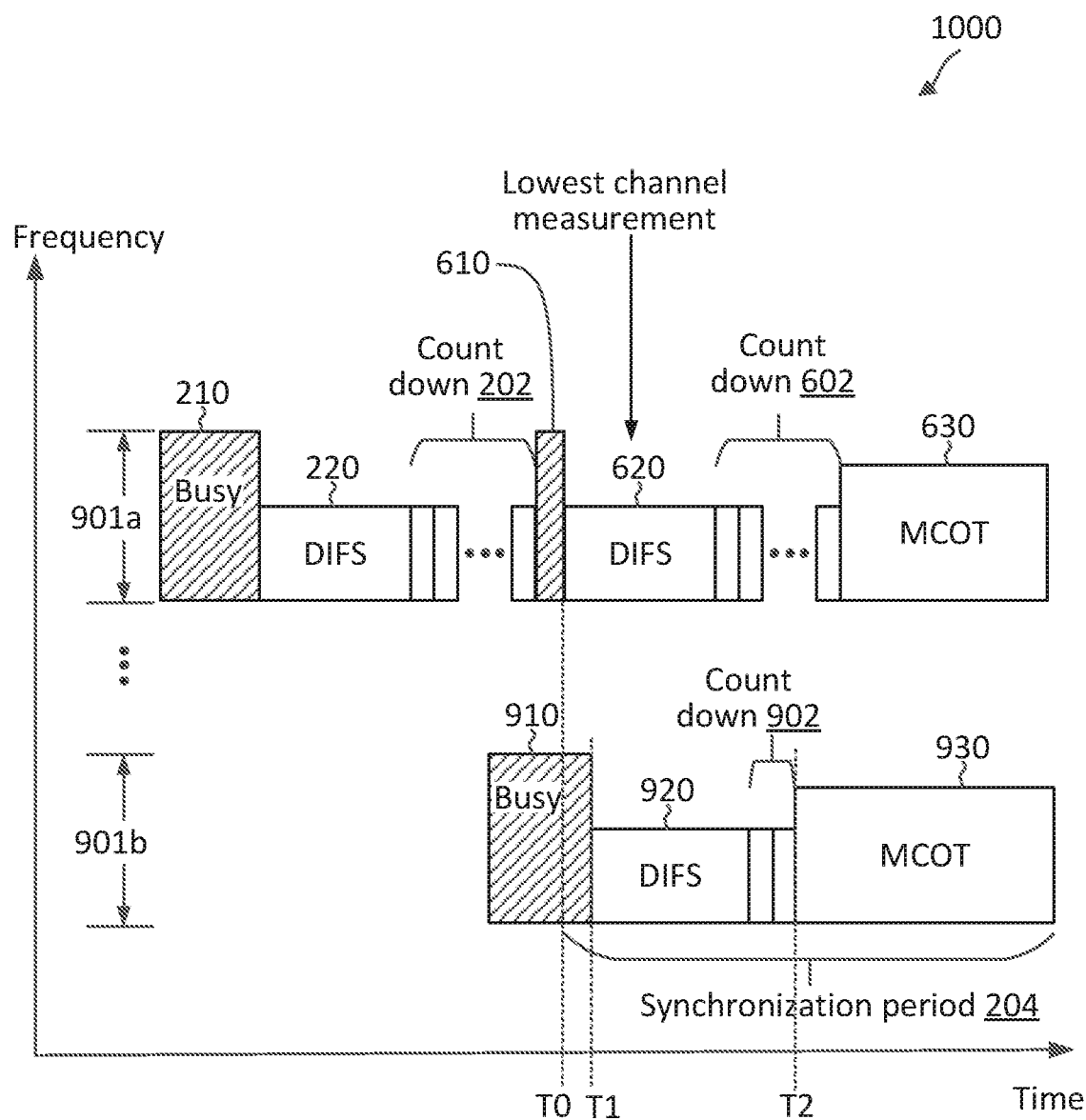
FIG. 10 illustrates a cooperative channel access scheme according to some aspects of the present disclosure.

FIG. 10 illustrates a cooperative asynchronous channel access scheme 1000 according to some aspects of the present disclosure. The scheme 1000 may be employed by BSs such as the BSs 105 and 400 and UEs such as the UEs 115 and 300 in a network such as the network 100. In particular, a BS and/or a UE may perform cooperative asynchronous channel access as shown in the scheme 1000. In FIG. 10, the x-axis represents time in some arbitrary units, and the y-axis represents time some arbitrary units. The scheme 1000 is described using a substantially similar channel access scenario as in the scheme 900 and may use the same reference numerals as in FIGS. 2, 5, and 6 for simplicity's sake. However, in the scheme 1000, an asynchronous node (e.g., the BSs 105 and/or 400 and/or the UEs 115 and/or 300) may determine a starting time or "sync instant" for a synchronization period of a nearby mode performing synchronous channel access based on a DIFS having a lowest channel measurement (e.g., CCA levels) from the channel sensing in the frequency band 901*a* and the channel sensing in the frequency band 901*b*. The node may subsequently determine an upper bound for the MCOT 630 based on an end time of the synchronization period 204.

As shown in FIG. 10, the node may determine that channel measurements (e.g., received signal power) measured during the DIFS period 620 in the frequency band 901*a* are lower than channel measurements measured during the DIFS period 920 in the frequency band 901*b*. In some instances, the node may utilize similar mechanism as discussed above with reference to FIG. 8 to record channel measurements and starting of corresponding DIFS periods. For instance, the node may record channel measurements (e.g., received signa power) computed during each DIFS period (e.g., the DIFS periods 220, 620) in the frequency band 901*a* and record the starting time of the DIFS periods. Similarly, the node may record channel measurements (e.g., received signa power) computed during each DIFS period (e.g., the DIFS periods 920) in the frequency band 901*b* and record the starting time of the DIFS period. Upon completing a countdown in the frequency band 901*b* (e.g., at time T2), the node may determine a starting time of a synchronization period 204 of a nearby node based on the starting time of a DIFS with the lowest channel measurement(s).

In some instances, the node may determine the synchronization period 204 with respect to the starting time (e.g., time T0) of the DIFS period 620 in response to a determination that a first channel measurement measured during the DIFS period 620 in the frequency band 901*a* has a smaller signal value than a second channel measurement measured during the DIFS period 920 in the frequency band 901*b* as shown in FIG. 10. Alternatively, the node may determine the synchronization period 204 with respect to the starting time (e.g., time T1) of the DIFS period 920 in response to a determination that a second channel measurement measured during the DIFS period 620 in the frequency band 901*b* has a smaller signal value than a first channel measurement measured during the DIFS period 920 in the frequency band 901*a*. In some aspects, each of the first channel measurement and the second channel measurement may be an average channel measurement over a corresponding DIFS periods. In some aspects, each of the first channel measurement and the second channel measurement may be a maximum channel measurement over a corresponding DIFS periods. The node may subsequently determine the MCOT 630 based on the synchronization period 204. For instance, the node may determine a duration for the MCOT 930 in the frequency band 901*b* such that the MCOT 930 may end at the same time as the end of the synchronization period 204. Similarly, the node may determine that a duration for the MCOT 630 in the frequency band 901*a* may end at the same time as the end of the synchronization period 204. The node may set $T_{DIFS}$ to the starting time of a DIFS period with the lowest channel measurements detected among the frequency bands 901 and determine the MCOT 630 duration as shown in Equation (1) discussed above.

In some aspects, the utilization of two ED thresholds (e.g., the ED threshold 542 for DIFS search and the ED threshold 544 for random backoff) for LBT can allow over-the-air (OTA) cooperation between close-by synchronous BSs (e.g., the BSs 105 and/or 400 and/or UEs 115 and/or 300) for CoMP or other spatial reuse schemes. CoMP can be coherent or non-coherent. Coherent CoMP may refer to multiple BSs (e.g., of the same operator) performing joint-transmit and/or joint-receive with tight synchronization across the BSs and the transmissions from the different BSs may be phase-matched. Non-coherent CoMP may refer to multiple BSs (e.g., of the same operator) performing joint-transmit without having tight synchronization across the BSs and the transmissions from the different BSs may be phase-mismatched. The OTA coordination may refer to close-by synchronous BSs performing coherent CoMP to coordinate channel sharing. Spatial reuse may refer to having multiple BSs communicating over the same spatial layers with interference control.

Figure 11:
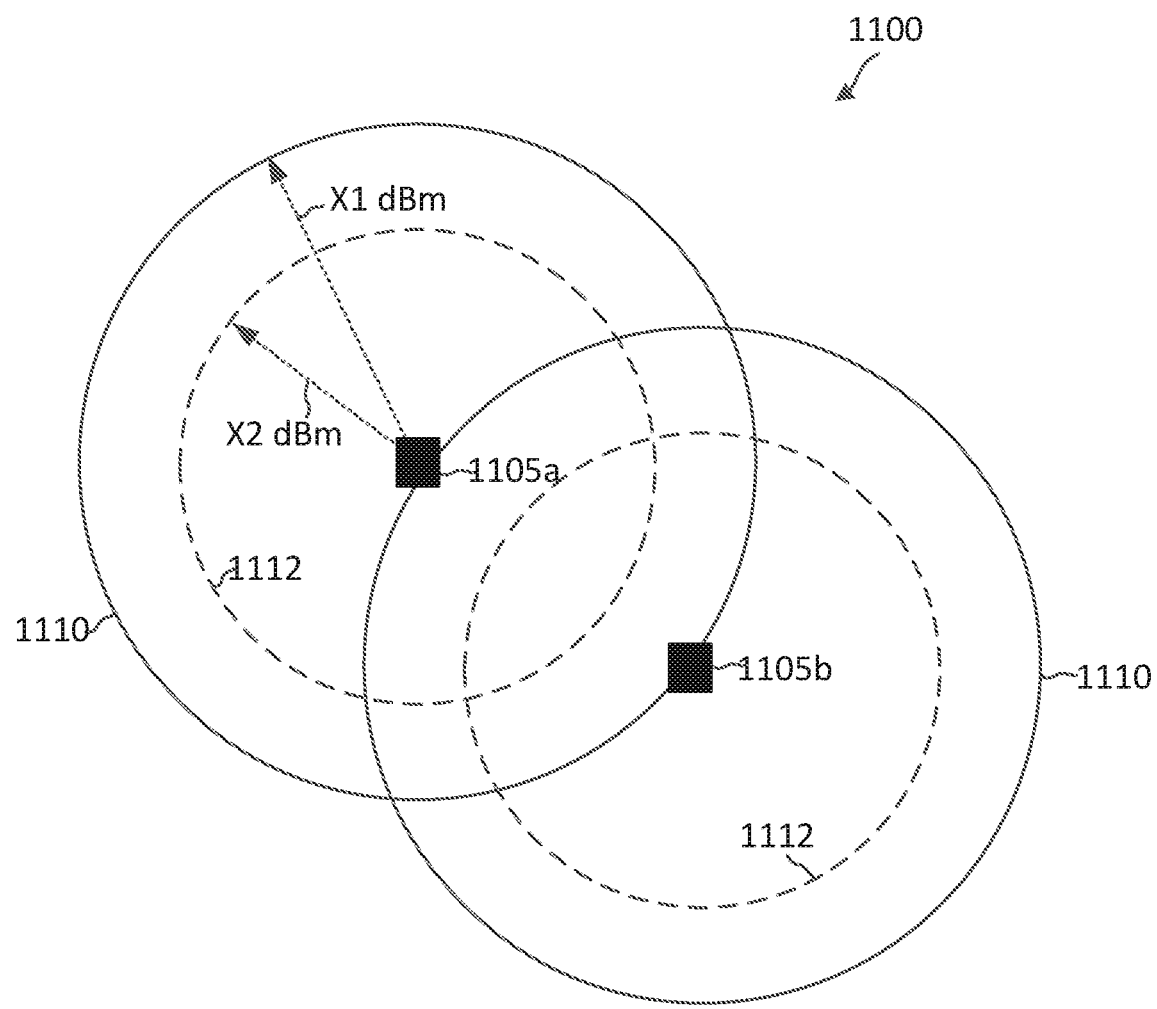
FIG. 11 illustrates a channel access scheme with coordinated multipoint (CoMP) according to some aspects of the present disclosure.

FIG. 11 illustrates a network deployment scheme 1100 according to some aspects of the present disclosure. The scheme 1100 may be employed by operators operating multiple BSs such as the BSs 105 and/or 400. In particular, an operator may deploy BSs during a network deployment as shown in the scheme 1100. In the scheme 1100, an operator may deploy multiple BSs 1105 (shown as a BS 1105a and a BS 1105b) such that adjacent BSs are within a certain sensing or ED threshold range 1110. For example, the BS 1105a and the BS 1105b are adjacent BSs and may be deployed such that the BSs 1105a and 1105b may detect each other transmissions with a ED threshold of X1 dBm (e.g., at about −72 dBm corresponding to the ED threshold 542) so that the BSs 1105a and 1105b may perform interference coordination using TDM. TDM-based interference management may refer to the BS 1105a coordinating with the BS 1105b to share a channel in a TDM manner. Additionally, the adjacent BSs 1105a and 1105b may be deployed such that the BSs 1105a and 1105b an inter-BS distance is large, for example, to reduce cost. For instance, the BSs 1105a and 1105b may be deployed such that the BSs 1105a and 1105 are boutside a ED threshold or sensing range 1112 of X2 dBm (e.g., about −62 dBm corresponding to the ED threshold 544) of each other.

In some aspects, the BSs 1105a and 1105b may be synchronized with each other and may perform synchronous channel access. When the BSs 1105a and 1105b compete for channel access simultaneously and the channel has a high traffic loading, the BSs 1105a and 1105b may identify DIFS (e.g., the DIFS periods 220, 620, and/or 920) at the same time. Each BS 1105a and 1105b may separately perform a random backoff upon detecting a DIFS. The BS 1105a or 1105b that completes the countdown first may send a coordination information message to the other BS 1105a or 1105b to coordinate CoMP or spatial reuse for transmissions during corresponding MCOTs as shown in FIG. 12.

Figure 12:
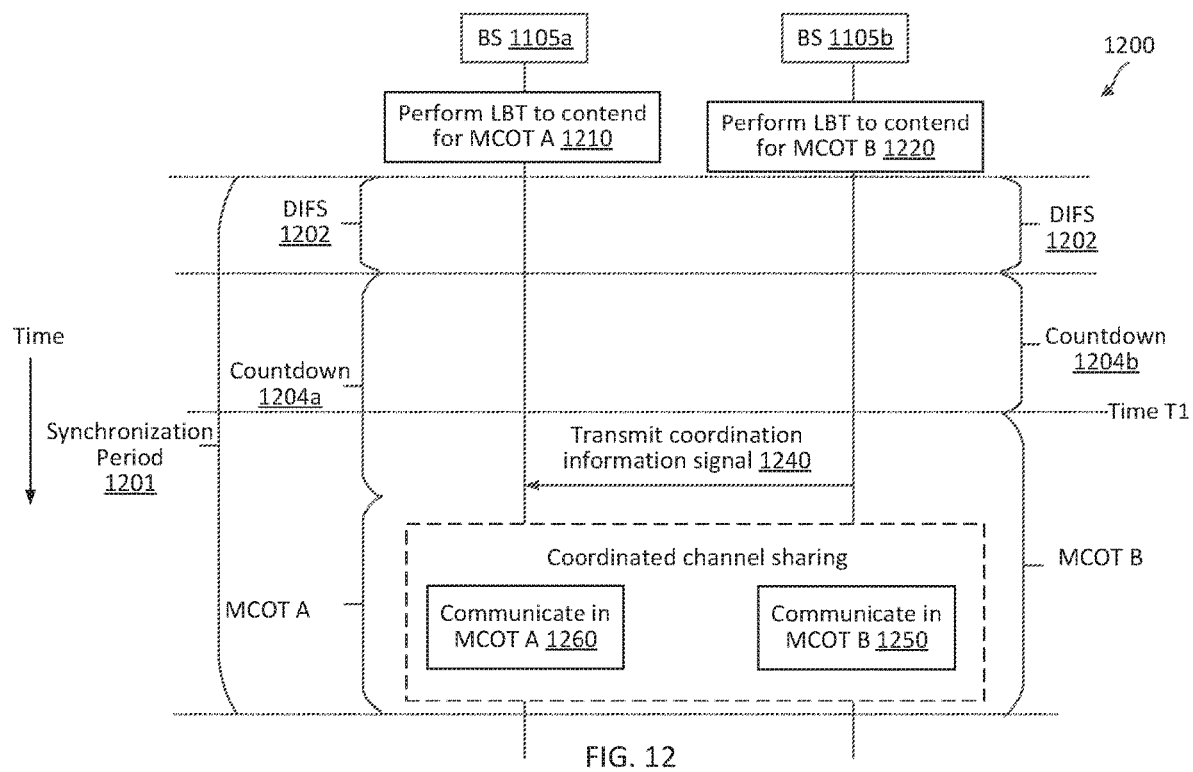
FIG. 12 is a signaling diagram illustrating a channel access method with CoMP according to some aspects of the present disclosure.

FIG. 12 is a signaling diagram illustrating a channel access method 1200 with CoMP according to some aspects of the present disclosure. The method 1200 may be implemented between the BSs 1105a and 1105b. As discussed, the BSs 1105a and 1105b are synchronous BSs, where the BS 1105a's timing is synchronized to the BS 1105b's timing. The BSs 1105a and 1105b may be cooperative BSs or partner BSs that coordinate with each other for channel access. The method 1200 may employ similar mechanisms as in the schemes 200, 500, and/or 1100 discussed above with respect to FIGS. 2, 5, and/or 11, respectively. As illustrated, the method 1200 includes a number of enumerated steps, but embodiments of the method 1200 may include additional steps before, after, and in between the enumerated steps. In some aspects, one or more of the enumerated steps may be omitted or performed in a different order. While the method 1200 is illustrated with two BSs, the method 1200 can be applied to any suitable number of BSs (e.g., about 3, 4 or more) performing CoMP for channel access.

At action 1210, the BS 1105a performs an LBT to contend for a MCOT A (e.g., the MCOTs 230, 630, and/or 930). The LBT may be a CAT4-based LBT as discussed above in the scheme 500. For instance, the BS 1105a may perform channel sensing in the channel to search for a DIFS (e.g., the DIFS periods 220, 620, and/or 920). Upon detecting a DIFS 1202 (e.g., the DIFS 220, 620, and/or 920) in the channel, the BS 1105a may perform a random backoff or countdown 1204a. During the countdown, the BS 1105a may continue to perform channel sensing to determine whether the channel remain idle or free over the countdown period (e.g., the countdown periods 202, 602, and/or 902). In some instances, the BS 1105a may utilize one or more components, such as the processor 402, the channel access module 408, the transceiver 410, the modem 412, and/or the one or more antennas 416, to perform the LBT.

At action 1220, the BS 1105b performs an LBT to contend for a MCOT B (e.g., the MCOTs 230, 630, and/or 930), for example, using similar mechanisms as the BS 1105a. For instance, the BS 1105b may also detect the DIFS 1202. The BS 1105b may perform a random backoff or countdown 1204b. During the countdown 1204b, the BS 1105b may continue to perform channel sensing to determine whether the channel remain idle or free over the countdown period (e.g., the countdown periods 202, 602, and/or 902). If the channel remains idle during the countdown 1204b, the BS 1105b may check out a MCOT B. The BS 1105b may determine the MCOT B based on a synchronization period 1201 (e.g., about 6 ms long). As an example, the BS 1105b may have selected a smaller random value for the random backoff, and thus may complete the countdown 1204b before the BS 1105a (e.g., at time T1) as shown. In some instances, the BS 1105b may utilize one or more components, such as the processor 402, the channel access module 408, the transceiver 410, the modem 412, and/or the one or more antennas 416, to perform the LBT.

At action 1240, the BS 1105b transmits a coordination information signal to the BS 1105a. The coordination information signal may be an OTA signal. The coordination information signal may indicate information related to transmissions in the MCOT B to assist the BS 1105a in performing coordinated channel sharing. In some instance, the coordination information signal may indicate spatial layer(s) that the BS 1105b may use for communications with UEs (e.g., the UEs 115 and/or 300) during MCOT B. In some instances, the BS 1105a may utilize one or more components, such as the processor 402, the channel access module 408, the transceiver 410, the modem 412, and/or the one or more antennas 416, to transmit the coordination information signal.

At action 1250, after transmitting the coordination information signal, the BS 1105b may communicate with the UEs during the MCOT B. In some instances, the BS 1105a may utilize one or more components, such as the processor 402, the channel access module 408, the transceiver 410, the modem 412, and/or the one or more antennas 416, to communicate with its serving UEs.

In some aspects, the BS 1105b may utilize a first transmit power to transmit the coordination informational at action 1240 and may subsequently utilize a second transmit power to transmit to UE(s) during the MCOT B. The first transmit power may be at a lower level than the second transmit power. For instance, the BS 1105b may determine the first transmit power such that the coordination information transmission at action 1240 may not block the LBT (e.g., the countdown 1204a) at the BS 1105a, but may be detected by the BS 1105a. For example, the BS 1105b may determine the first transmit power for the OTA coordination information signal transmission based on a ED threshold (e.g., the ED threshold 544) used by the BS 1105a for channel sensing during the countdown 1204a. The second transmit power may be a full transmit power. In some instances, the second transmit power (used for communicating with the UEs) is upper bounded by a regulation upper bound, which may be based on the ED threshold (e.g., the ED threshold 542) used for DIFS search. The first transmit power (used for transmitting the coordination information signal) may be upper bounded by a minimum of the regulation upper bound and a transmit power determined in a network planning stage so that a received power at the target BS (e.g., the BS 1105*a*) is less than the ED threshold (e.g., the ED threshold 544) used for random backoff.

In some aspects, the BS 1105*a* may power on and/or enable both an LBT engine and a receiver engine (e.g., at a transceiver such as the transceiver 410) in order to receive the coordination information signal from the BS 1105*a* while performing the LBT (e.g., the countdown 1204*a*).

At action 1260, the BS 1105*a* checks out a COT MCOT A and communicate with UEs served by the BS 1105*a*, for example, the BS 1105*a* may determine that the channel remain idle during the countdown 1204*a*. In some aspects, the BS 1105*a* may determine scheduling parameters (e.g., spatial layer and/or transmit power parameters) for its serving UEs based on coordination information received from the BS 1105*b*. Similarly, the BS 1105*b* may determine scheduling parameters (e.g., spatial layer and/or transmit power parameters) for its serving UEs based on the coordination information. For instance, in some instances, the BS 1105*a* and 1105*b* may use the same spatial layer for communications with corresponding serving UEs (e.g., based on a spatial reuse) and may additionally control transmission power for interference management. In some instances, the BS 1105*a* and 1105*b* may use different spatial layers for communications with corresponding serving UEs.

In some aspects, the BS 1105*b* may not be aware whether the BS 1105*b* completes the countdown 1204*b* before the BS 1105*a*. Upon completing the countdown 1204*b*, the BS 1105*b* may determine whether to transmit the coordination information signal to the BS 1105*a* based on whether a random value selected for the countdown 1204*b* satisfies a threshold. For instance, if the selected random value (e.g., the backoff value) is below the threshold., the BS 1105*b* may transmit the coordination information signal. If the selected random value is above the threshold., the BS 1105*b* may not transmit the coordination information signal.

In some aspects, the BS 1105*b* may determine whether to whether to transmit the coordination information signal to the BS 1105*a* based on whether a remaining random number before the most recent DIFS satisfies a threshold. For instance, the channel may have a high traffic load and the BS 1105*b* may detect a channel busy status while counting down (e.g., as shown in the schemes 600, 700, 800, 900, and 100), and thus may suspend the countdown until a next DIFS is identified. In other words, the BS 1105*b* may determine whether a countdown value or backoff value used for a most recent or latest DIFS satisfies the threshold. If the latest backoff value is below threshold, the BS 1105*b* may transmit the coordination information signal. If the latest backoff value is above the threshold., the BS 1105*b* may not transmit the coordination information signal.

Figure 13:
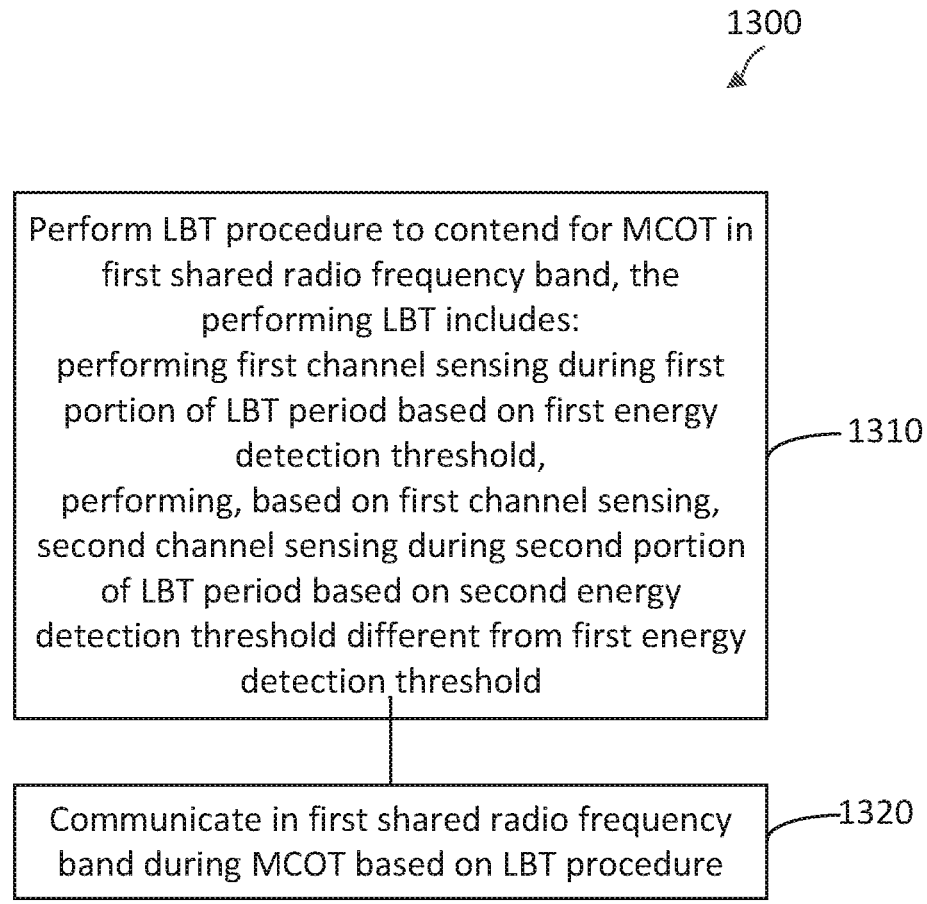
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115 and/or 300, may utilize one or more components, such as the processor 302, the memory 304, the channel access module 308, the transceiver 310, the modem 312, and the one or more antennas 316, to execute the steps of method 1300. Alternatively, a wireless communication device, such as the BSs 105 and/or 400, may utilize one or more components, such as the processor 402, the memory 404, the channel access module 408, the transceiver 410, the modem 412, and the one or more antennas 416, to execute the steps of method 1300. The method 1300 may employ similar mechanisms as in the schemes 200, 500, 600, 700, 800, 900, 1000, and/or 1100 discussed above with respect to FIGS. 2, 5, 6, 7, 8, 9, 10, and/or 11, respectively, and the method 1200 discussed above with respect to FIG. 12. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a wireless communication device (e.g., the BSs 105, 400, and/or 1105 and UEs such as the UEs 115 and/or 300) performs an LBT procedure to contend for a MCOT (e.g., the MCOTs 230, 630, and/or 930) in a first shared radio frequency band (e.g., the frequency band 901*s*).

The performing the LBT includes performing, in the first shared radio frequency band, first channel sensing during a first portion of an LBT period based on a first energy detection threshold (e.g., the ED threshold 542). For instance, the wireless communication device may perform the first channel sensing by receiving a signal from the channel, computing a channel measurement from the received signal (e.g., a receive signal power), and comparing the channel measurement to the first energy detection threshold. If the channel measurement exceeds the first ED threshold, the wireless communication device may determine that the channel is busy. If the channel measurement is below the first ED threshold, the wireless communication device may determine that the channel is idle. In some instances, the wireless communication device may compute multiple channel measurements over the duration of the first portion of the LBT period, for example, at certain time intervals or continuously (e.g., using sliding window mechanisms).

The performing the LBT may also include performing, in the first shared radio frequency band based on the first channel sensing, second channel sensing during a second portion of the LBT period based on a second energy detection threshold (e.g., ED threshold 544) different from the first energy detection threshold. For instance, the wireless communication device may perform the second channel sensing by receiving a signal from the channel, computing a channel measurement from the received signal (e.g., a receive signal power), and comparing the channel measurement to the first energy detection threshold. If the channel measurement exceeds the second ED threshold, the wireless communication device may determine that the channel is busy. If the channel measurement is below the second ED threshold, the wireless communication device may determine that the channel is idle. In some instances, the wireless communication device may compute multiple channel measurements over the duration of the second portion of the LBT period, for example, at certain time intervals or continuously (e.g., using sliding window mechanisms).

In some instances, the wireless communication device may utilize one or more components, such as the processor 302 and/or 402, the channel access module 308 and/or 408, the transceiver 310 and/or 410, the modem 312 and/or 412, and/or the one or more antennas 316 and/or 416, to perform the LBT procedure.

In some aspects, the first energy detection threshold may be lower than the second energy detection threshold.

In some aspects, the performing the LBT procedure may further include identifying a DIFS (e.g., the DIFS 220, 620, 920, and/or 1202) in the first shared radio frequency band based on the first channel sensing. For instance, the wireless communication device may identify the DIFS by searching for a period of time during which all channel measurements in the first shared radio frequency band are below the first energy detection threshold. The performing the LBT procedure may further include switching from the first energy detection threshold to the second energy detection threshold for the second channel sensing based on the identifying the DIFS, where the second channel sensing is associated with a random backoff (e.g., countdown).

In some aspects, the performing the LBT procedure may further include switching from the first energy detection threshold to the second energy detection threshold for the second channel sensing further based on the LBT procedure being associated with an additional backoff. In some aspects, the performing the LBT procedure may further include determining whether to apply the additional backoff to the LBT procedure based on a priority (e.g., a traffic priority) associated with the communication signal. In some aspects, the additional backoff may be associated with a PD (e.g., the PD 512), a synchronous channel access (e.g., the synchronous channel access 514), and/or a cooperative asynchronous channel access (e.g., the cooperative asynchronous channel access 516) as discussed in the scheme 500 with reference to FIG. 5. In some instances, the performing the LBT procedure may further include performing a preamble detection during at least a portion of the LBT period. In some instances, the performing the LBT procedure may further include performing at least one of the first channel sensing or the second channel sensing based on a synchronization period (e.g., the synchronization period 204) associated with a synchronous channel access mode, a duration of the MCOT being based on the synchronization period. In some aspects, the performing the LBT procedure may further include performing at least one of the first channel sensing or the second channel sensing based on a synchronization period associated with a synchronous channel access mode, a duration of the MCOT being based on the synchronization period. In some aspects, the performing the LBT procedure may also include performing at least one of the first channel sensing or the second channel sensing based on the synchronous channel access mode. In some aspects, the performing the LBT procedure may also include performing at least one of the first channel sensing or the second channel sensing based on an asynchronous channel access mode.

In some aspects, the performing the LBT procedure may further include switching, in response to a channel busy status from the second channel sensing, from the second energy detection threshold to the first energy detection threshold for third channel sensing, for example, as shown in the ED threshold profile 650 discussed above with reference to FIG. 6. The performing the LBT procedure may further include performing the third channel sensing during a third portion of the LBT period after the second portion of the LBT period based on the first energy detection threshold to identify a DIFS. In some aspects, the performing the LBT procedure may further include performing, in response to a channel busy status from the second channel sensing, third channel sensing during a third portion of the LBT period after the second portion of the LBT period based on the second energy detection threshold to identify a DIFS, for example, as shown in the ED threshold profile 640 discussed above with reference to FIG. 6. In some aspects, the performing the LBT procedure may further include performing the third channel sensing based on the second energy detection threshold is further based on a channel measurement in a DIFS detected from the first channel sensing satisfying a signal level threshold. In some aspects, the performing the LBT procedure may further include performing, in response to a channel busy status from the second channel sensing, third channel sensing during a third portion of the LBT period after the second portion of the LBT period. The performing the LBT procedure may further include determining whether to perform the third LBT based on the first energy detection threshold or the second energy detection threshold based on a channel access priority.

At block 1320, the wireless communication device communicates, in the first shared radio frequency band, a communication signal (e.g., PDSCH, PDCCH, PUSCH, and/or PUCCH) during the MCOT based on the LBT procedure. In some instances, the wireless communication device may utilize one or more components, such as the processor 302 and/or 402, the channel access module 308 and/or 408, the transceiver 310 and/or 410, the modem 312 and/or 412, and/or the one or more antennas 316 and/or 416, to communicate the communication signal.

In some aspects, the wireless communication device may also determine a synchronization period associated with synchronous channel access with respect to a starting time of a latest DIFS detected from the LBT procedure, for example, as shown in the scheme 700 discussed above with reference to FIG. 7. The wireless communication device may also determine the MCOT based on the synchronization period, for example, according to equation (1).

In some aspects, the wireless communication device may also determine a synchronization period associated with synchronous channel access with respect to a first starting time of a first DIFS detected from the LBT procedure or a second starting time of a second DIFS detected from the LBT procedure based on a comparison between a first channel measurement in the first DIFS and a second channel measurement in the second DIFS, for example, as shown in the scheme 800 discussed above with reference to FIG. 8. The wireless communication device may also determine the MCOT based on the synchronization period. In some aspects, the determining the synchronization period may include determining the synchronization period with respect to the first starting time of the first DIFS in response to a determination that the first channel measurement has a smaller signal value than the second channel measurement or determining the synchronization period with respect to the second starting time of the second DIFS in response to a determination that the second channel measurement has a smaller signal value than the first channel measurement.

In some aspects, the wireless communication device may also perform third channel sensing in a second shared radio frequency band different from the first shared radio frequency band. The wireless communication device may also determine a synchronization period with respect to a first starting time of a first DIFS detected from the LBT procedure or a second starting time of a second DIFS detected from the LBT procedure based on a comparison between the first starting time and the second starting time, for example, as shown in the scheme 900 discussed above with reference to FIG. 9. The wireless communication device may also determine the MCOT based on the synchronization period, for example, according to equation (1). In some aspects, the determining the synchronization period may also include determining the synchronization period with respect to the first starting time of the first DIFS in response to a determination that the first starting time of the first DIFS is later than the second starting time of the second DIFS or determining the synchronization period with respect to the second starting time of the second DIFS in response to a determination that the second starting time of the second DIFS is later than the first starting time of the first DIFS.

In some aspects, the wireless communication device may also perform third channel sensing in a second shared radio frequency band different from the first shared radio frequency band. The wireless communication device may also determine a synchronization period with respect to a first starting time of a first DIFS detected from the LBT procedure or a second starting time of a second DIFS detected from the LBT procedure based on a comparison between a first channel measurement in the first DIFS and a second channel measurement in the second DIFS, for example, as shown in the scheme 1000 discussed above with reference to FIG. 10. The wireless communication device may also determine the MCOT based on the synchronization period, for example, according to equation (1). The determining the synchronization period may include determining the synchronization period with respect to the first starting time of the first DIFS in response to a determination that the first channel measurement has a smaller signal value than the second channel measurement or determining the synchronization period with respect to the second starting time of the second DIFS in response to a determination that the second channel measurement has a smaller signal value than the first channel measurement.

In some aspects, the wireless communication device is a first BS (e.g., the BSs 105, 400, and/or 1105). The first BS may also transmit, to a second BS, a coordination information signal during the MCOT using a first transmit power, the coordination information signal including a parameter associated with the communicating the communication signal in the MCOT. The communicating the communication signal at block 1320 may include transmitting the communication signal based on a second transmit power different from the first transmit power, for example, as shown in the method 1200 discussed above with reference to FIG. 12. In some aspects, the first transmit power is based on the second energy detection threshold, and the second transmit power is based on the first energy detection threshold. In some aspects, the transmitting the coordination information signal includes transmitting, to the second BS, the coordination information signal based on a countdown value associated with the second channel sensing satisfying a threshold. In some aspects, the transmitting the coordination information signal may also include transmitting, to the second BS, the coordination information signal based on a countdown value at a beginning the first channel sensing satisfying a threshold and a channel idle period detected from the first channel sensing being a latest detected channel idle period in the LBT procedure.

Further aspects of the present disclosure include an apparatus including a processor configured to perform a listen-before-talk (LBT) procedure to contend for a maximum channel occupancy time (MCOT) in a first shared radio frequency band, the processor configured to perform the LBT procedure is configured to perform, in the first shared radio frequency band, first channel sensing during a first portion of an LBT period based on a first energy detection threshold; and perform, in the first shared radio frequency band based on the first channel sensing, second channel sensing during a second portion of the LBT period based on a second energy detection threshold different from the first energy detection threshold; and a transceiver configured to communicate, in the first shared radio frequency band, a communication signal during the MCOT based on the LBT procedure.

The apparatus may also include one or more of the following features. For instance, the apparatus includes where the first energy detection threshold is lower than the second energy detection threshold. The processor configured to perform the LBT procedure is further configured to identify a distributed coordination function interframe spacing (DIFS) in the first shared radio frequency band based on the first channel sensing; and switch from the first energy detection threshold to the second energy detection threshold for the second channel sensing based on the identification of the DIFS, and where the second channel sensing is associated with a random backoff. The processor configured to perform the LBT procedure is further configured to switch from the first energy detection threshold to the second energy detection threshold for the second channel sensing further based on the LBT procedure being associated with an additional backoff. The processor configured to perform the LBT procedure is further configured to determine whether to apply the additional backoff to the LBT procedure based on a priority associated with the communication signal. The processor configured to perform the LBT procedure is further configured to perform a preamble detection during at least a portion of the LBT period, where the additional backoff is associated with the preamble detection. The processor configured to perform the LBT procedure is configured to perform at least one of the first channel sensing or the second channel sensing based on a synchronization period associated with a synchronous channel access mode, a duration of the MCOT being based on the synchronization period, where the additional backoff is associated with the synchronous channel access mode. The processor is further configured to determine the duration of the MCOT by subtracting the DIFS and the second portion of the LBT period from the synchronization period. The processor configured to perform the LBT procedure is further configured to perform at least one of the first channel sensing or the second channel sensing based on the synchronous channel access mode. The apparatus is a first base station (BS), and where the transceiver is further configured to transmit, to a second BS, a coordination information signal during the MCOT using a first transmit power, the coordination information signal including a parameter associated with the communication signal in the MCOT, and where the transceiver configured to communicate the communication signal is configured to transmit the communication signal based on a second transmit power different from the first transmit power. The first transmit power is based on the second energy detection threshold, and where the second transmit power is based on the second energy detection threshold. The processor configured to transmit the coordination information signal is configured to transmit, to the second BS, the coordination information signal based on a countdown value associated with the second channel sensing satisfying a threshold. The processor configured to transmit the coordination information signal is configured to transmit, to the second BS, the coordination information signal based on a countdown value at a beginning the first channel sensing satisfying a threshold and a channel idle period detected from the first channel sensing being a latest detected channel idle period in the LBT procedure. The processor configured to perform the LBT procedure is further configured to perform at least one of the first channel sensing or the second channel sensing based on an asynchronous channel access mode; and synchronize the DIFS to the synchronization period. The processor is further configured to determine a synchronization period associated with synchronous channel access with respect to a starting time of a latest distributed coordination function interframe spacing (DIFS) detected from the LBT procedure; and determine the MCOT based on the synchronization period. The processor is further configured to determine a synchronization period associated with synchronous channel access with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and determine the MCOT based on the synchronization period. The processor configured to determine the synchronization period is configured to at least one of determine the synchronization period with respect to the first starting time of the first DIFS in response to a determination that the first channel measurement has a smaller signal value than the second channel measurement; or determine the synchronization period with respect to the second starting time of the second DIFS in response to a determination that the second channel measurement has a smaller signal value than the first channel measurement. The processor is further configured to perform third channel sensing in a second shared radio frequency band different from the first shared radio frequency band; determine a synchronization period with respect to a first starting time of a first distributed coordination function interframe spacing (DIFS) detected from the LBT procedure or a second starting time of a second DIFS detected from the LBT procedure based on a comparison between the first starting time and the second starting time; and determine the MCOT based on the synchronization period. The processor configured to determine the synchronization period is configured to at least one of determine the synchronization period with respect to the first starting time of the first DIFS in response to a determination that the first starting time of the first DIFS is later than the second starting time of the second DIFS; or determine the synchronization period with respect to the second starting time of the second DIFS in response to a determination that the second starting time of the second DIFS is later than the first starting time of the first DIFS. The processor is further configured to perform third channel sensing in a second shared radio frequency band different from the first shared radio frequency band; determine a synchronization period with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and determine the MCOT based on the synchronization period. The processor configured to determine the synchronization period is configured to at least one of determine the synchronization period with respect to the first starting time of the first DIFS in response to a determination that the first channel measurement has a smaller signal value than the second channel measurement; or determine the synchronization period with respect to the second starting time of the second DIFS in response to a determination that the second channel measurement has a smaller signal value than the first channel measurement. The processor configured to perform the LBT procedure is further configured to switch, in response to a channel busy status from the second channel sensing, from the second energy detection threshold to the first energy detection threshold for third channel sensing; and perform the third channel sensing during a third portion of the LBT period after the second portion of the LBT period based on the first energy detection threshold to identify a DIFS. The processor configured to perform the LBT procedure is further configured to perform, in response to a channel busy status from the second channel sensing, third channel sensing during a third portion of the LBT period after the second portion of the LBT period based on the second energy detection threshold to identify a DIFS. The processor configured to perform the LBT procedure is further configured to perform the third channel sensing based on the second energy detection threshold is further based on a channel measurement in a DIFS detected from the first channel sensing satisfying a signal level threshold. The processor configured to perform the LBT procedure further configured to perform, in response to a channel busy status from the second channel sensing, third channel sensing during a third portion of the LBT period after the second portion of the LBT period; and determine whether to perform the third LBT based on the first energy detection threshold or the second energy detection threshold based on a channel access priority.

Further aspects of the present disclosure include a non-transitory computer-readable medium having program code recorded thereon. The program code includes code for causing a wireless communication device to perform a listen-before-talk (LBT) procedure to contend for a maximum channel occupancy time (MCOT) in a first shared radio frequency band, the code for causing the wireless communication device to perform the LBT procedure is configured to perform, in the first shared radio frequency band, first channel sensing during a first portion of an LBT period based on a first energy detection threshold; and perform, in the first shared radio frequency band based on the first channel sensing, second channel sensing during a second portion of the LBT period based on a second energy detection threshold different from the first energy detection threshold; and code for causing the wireless communication device to communicate, in the first shared radio frequency band, a communication signal during the MCOT based on the LBT procedure.

The non-transitory computer-readable medium may also include one or more of the following features. For instance, the non-transitory computer-readable medium includes where the first energy detection threshold is lower than the second energy detection threshold. The code for causing the wireless communication device to perform the LBT procedure is further configured to identify a distributed coordination function interframe spacing (DIFS) in the first shared radio frequency band based on the first channel sensing; and switch from the first energy detection threshold to the second energy detection threshold for the second channel sensing based on the identification of the DIFS, and where the second channel sensing is associated with a random backoff. The code for causing the wireless communication device to perform the LBT procedure is further configured to switch from the first energy detection threshold to the second energy detection threshold for the second channel sensing further based on the LBT procedure being associated with an additional backoff. The code for causing the wireless communication device to perform the LBT procedure is further configured to determine whether to apply the additional backoff to the LBT procedure based on a priority associated with the communication signal. The code for causing the wireless communication device to perform the LBT procedure is further configured to perform a preamble detection during at least a portion of the LBT period, where the additional backoff is associated with the preamble detection. The code for causing the wireless communication device to perform the LBT procedure is configured to perform at least one of the first channel sensing or the second channel sensing based on a synchronization period associated with a synchronous channel access mode, a duration of the MCOT being based on the synchronization period, where the additional backoff is associated with the synchronous channel access mode. The non-transitory computer-readable medium may include ode for causing the wireless communication device to determine the duration of the MCOT by subtracting the DIFS and the second portion of the LBT period from the synchronization period. The code for causing the wireless communication device to perform the LBT procedure is further configured to perform at least one of the first channel sensing or the second channel sensing based on the synchronous channel access mode. The wireless communication device is a first base station (BS), and where the program code further includes code for causing the wireless communication device to transmit, to a second BS, a coordination information signal during the MCOT using a first transmit power, the coordination information signal including a parameter associated with the communication signal in the MCOT, and where the code for causing the wireless communication device to communicate the communication signal is configured to transmit the communication signal based on a second transmit power different from the first transmit power. The first transmit power is based on the second energy detection threshold, and where the second transmit power is based on the second energy detection threshold. The code for causing the wireless communication device to transmit the coordination information signal is configured to transmit, to the second BS, the coordination information signal based on a countdown value associated with the second channel sensing satisfying a threshold. The code for causing the wireless communication device to transmit the coordination information signal is configured to transmit, to the second BS, the coordination information signal based on a countdown value at a beginning the first channel sensing satisfying a threshold and a channel idle period detected from the first channel sensing being a latest detected channel idle period in the LBT procedure. The code for causing the wireless communication device to perform the LBT procedure is further configured to perform at least one of the first channel sensing or the second channel sensing based on an asynchronous channel access mode; and synchronize the DIFS to the synchronization period. The non-transitory computer-readable medium of any 52, or 60, may include code for causing the wireless communication device to determine a synchronization period associated with synchronous channel access with respect to a starting time of a latest distributed coordination function interframe spacing (DIFS) detected from the LBT procedure; and code for causing the wireless communication device to determine the MCOT based on the synchronization period. The non-transitory computer-readable medium of any 52, or 60, may include code for causing the wireless communication device to determine a synchronization period associated with synchronous channel access with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and code for causing the wireless communication device to determine the MCOT based on the synchronization period. The code for causing the wireless communication device to determine the synchronization period is configured to at least one of determine the synchronization period with respect to the first starting time of the first DIFS in response to a determination that the first channel measurement has a smaller signal value than the second channel measurement; or determine the synchronization period with respect to the second starting time of the second DIFS in response to a determination that the second channel measurement has a smaller signal value than the first channel measurement. The non-transitory computer-readable medium of any 52, or 60, may include code for causing the wireless communication device to perform third channel sensing in a second shared radio frequency band different from the first shared radio frequency band; code for causing the wireless communication device to determine a synchronization period with respect to a first starting time of a first distributed coordination function interframe spacing (DIFS) detected from the LBT procedure or a second starting time of a second DIFS detected from the LBT procedure based on a comparison between the first starting time and the second starting time; and code for causing the wireless communication device to determine the MCOT based on the synchronization period. The code for causing the wireless communication device to determine the synchronization period is configured to at least one of determine the synchronization period with respect to the first starting time of the first DIFS in response to a determination that the first starting time of the first DIFS is later than the second starting time of the second DIFS; or determine the synchronization period with respect to the second starting time of the second DIFS in response to a determination that the second starting time of the second DIFS is later than the first starting time of the first DIFS. The non-transitory computer-readable medium of any 52, or 60, may include code for causing the wireless communication device to perform third channel sensing in a second shared radio frequency band different from the first shared radio frequency band; code for causing the wireless communication device to determine a synchronization period with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and code for causing the wireless communication device to determine the MCOT based on the synchronization period. The code for causing the wireless communication device to determine the synchronization period is configured to at least one of determine the synchronization period with respect to the first starting time of the first DIFS in response to a determination that the first channel measurement has a smaller signal value than the second channel measurement; or determine the synchronization period with respect to the second starting time of the second DIFS in response to a determination that the second channel measurement has a smaller signal value than the first channel measurement. The code for causing the wireless communication device to perform the LBT procedure is further configured to switch, in response to a channel busy status from the second channel sensing, from the second energy detection threshold to the first energy detection threshold for third channel sensing; and perform the third channel sensing during a third portion of the LBT period after the second portion of the LBT period based on the first energy detection threshold to identify a DIFS. The code for causing the wireless communication device to perform the LBT procedure is further configured to perform, in response to a channel busy status from the second channel sensing, third channel sensing during a third portion of the LBT period after the second portion of the LBT period based on the second energy detection threshold to identify a DIFS. The code for causing the wireless communication device to perform the LBT procedure is further configured to perform the third channel sensing based on the second energy detection threshold is further based on a channel measurement in a DIFS detected from the first channel sensing satisfying a signal level threshold. The code for causing the wireless communication device to perform the LBT procedure further configured to perform, in response to a channel busy status from the second channel sensing, third channel sensing during a third portion of the LBT period after the second portion of the LBT period; and determine whether to perform the third LBT based on the first energy detection threshold or the second energy detection threshold based on a channel access priority.

Further aspects of the present disclosure include an apparatus including means for performing a listen-before-talk (LBT) procedure to contend for a maximum channel occupancy time (MCOT) in a first shared radio frequency band, the means for performing the LBT procedure is configured to perform, in the first shared radio frequency band, first channel sensing during a first portion of an LBT period based on a first energy detection threshold; and perform, in the first shared radio frequency band based on the first channel sensing, second channel sensing during a second portion of the LBT period based on a second energy detection threshold different from the first energy detection threshold; and means for communicating, in the first shared radio frequency band, a communication signal during the MCOT based on the LBT procedure.

The apparatus may also include one or more of the following features. For instance, the apparatus includes where the first energy detection threshold is lower than the second energy detection threshold. The means for performing the LBT procedure is further configured to identify a distributed coordination function interframe spacing (DIFS) in the first shared radio frequency band based on the first channel sensing; and switch from the first energy detection threshold to the second energy detection threshold for the second channel sensing based on the identification of the DIFS, and where the second channel sensing is associated with a random backoff. The means for performing the LBT procedure is further configured to switch from the first energy detection threshold to the second energy detection threshold for the second channel sensing further based on the LBT procedure being associated with an additional backoff. The means for performing the LBT procedure is further configured to determine whether to apply the additional backoff to the LBT procedure based on a priority associated with the communication signal. The means for performing the LBT procedure is further configured to perform a preamble detection during at least a portion of the LBT period, where the additional backoff is associated with the preamble detection. The means for performing the LBT procedure is configured to perform at least one of the first channel sensing or the second channel sensing based on a synchronization period associated with a synchronous channel access mode, a duration of the MCOT being based on the synchronization period, where the additional backoff is associated with the synchronous channel access mode. The apparatus may include means for determining the duration of the MCOT by subtracting the DIFS and the second portion of the LBT period from the synchronization period. The means for performing the LBT procedure is further configured to perform at least one of the first channel sensing or the second channel sensing based on the synchronous channel access mode. The apparatus is a first base station (BS), the apparatus may include means for transmitting, to a second BS, a coordination information signal during the MCOT using a first transmit power, the coordination information signal including a parameter associated with the communication signal in the MCOT, and where the means for communicating the communication signal is configured to transmit the communication signal based on a second transmit power different from the first transmit power. The first transmit power is based on the second energy detection threshold, and where the second transmit power is based on the second energy detection threshold. The means for transmitting the coordination information signal is configured to transmit, to the second BS, the coordination information signal based on a countdown value associated with the second channel sensing satisfying a threshold. The means for transmitting the coordination information signal is configured to transmit, to the second BS, the coordination information signal based on a countdown value at a beginning the first channel sensing satisfying a threshold and a channel idle period detected from the first channel sensing being a latest detected channel idle period in the LBT procedure. The means for performing the LBT procedure is further configured to perform at least one of the first channel sensing or the second channel sensing based on an asynchronous channel access mode; and synchronize the DIFS to the synchronization period. The apparatus of any 77, or 85, may include means for determining a synchronization period associated with synchronous channel access with respect to a starting time of a latest distributed coordination function interframe spacing (DIFS) detected from the LBT procedure; and means for determining the MCOT based on the synchronization period. The apparatus of any 77, or 85, may include means for determining a synchronization period associated with synchronous channel access with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and means for determining the MCOT based on the synchronization period. The means for determining the synchronization period is configured to at least one of determine the synchronization period with respect to the first starting time of the first DIFS in response to a determination that the first channel measurement has a smaller signal value than the second channel measurement; or determine the synchronization period with respect to the second starting time of the second DIFS in response to a determination that the second channel measurement has a smaller signal value than the first channel measurement. The apparatus of any 77, or 85, may include means for performing third channel sensing in a second shared radio frequency band different from the first shared radio frequency band; means for determining a synchronization period with respect to a first starting time of a first distributed coordination function interframe spacing (DIFS) detected from the LBT procedure or a second starting time of a second DIFS detected from the LBT procedure based on a comparison between the first starting time and the second starting time; and means for determining the MCOT based on the synchronization period. The means for determining the synchronization period is configured to at least one of determine the synchronization period with respect to the first starting time of the first DIFS in response to a determination that the first starting time of the first DIFS is later than the second starting time of the second DIFS; or determine the synchronization period with respect to the second starting time of the second DIFS in response to a determination that the second starting time of the second DIFS is later than the first starting time of the first DIFS. The apparatus of any 77, or 85, may include means for performing third channel sensing in a second shared radio frequency band different from the first shared radio frequency band; means for determining a synchronization period with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and means for determining the MCOT based on the synchronization period. The means for determining the synchronization period is configured to at least one of determine the synchronization period with respect to the first starting time of the first DIFS in response to a determination that the first channel measurement has a smaller signal value than the second channel measurement; or determine the synchronization period with respect to the second starting time of the second DIFS in response to a determination that the second channel measurement has a smaller signal value than the first channel measurement. The means for performing the LBT procedure is further configured to switch, in response to a channel busy status from the second channel sensing, from the second energy detection threshold to the first energy detection threshold for third channel sensing; and perform the third channel sensing during a third portion of the LBT period after the second portion of the LBT period based on the first energy detection threshold to identify a DIFS. The means for performing the LBT procedure is further configured to perform, in response to a channel busy status from the second channel sensing, third channel sensing during a third portion of the LBT period after the second portion of the LBT period based on the second energy detection threshold to identify a DIFS. The means for performing the LBT procedure is further configured to perform the third channel sensing based on the second energy detection threshold is further based on a channel measurement in a DIFS detected from the first channel sensing satisfying a signal level threshold. The means for performing the LBT procedure further configured to perform, in response to a channel busy status from the second channel sensing, third channel sensing during a third portion of the LBT period after the second portion of the LBT period; and determine whether to perform the third LBT based on the first energy detection threshold or the second energy detection threshold based on a channel access priority.

Further aspects of the present disclosure include the following:

1. A method of wireless communication performed by a wireless communication device, comprising:
   performing a listen-before-talk (LBT) procedure to contend for a maximum channel occupancy time (MCOT) in a first shared radio frequency band, the performing the LBT comprising:
   performing, in the first shared radio frequency band, first channel sensing during a first portion of an LBT period based on a first energy detection threshold; and
   performing, in the first shared radio frequency band based on the first channel sensing, second channel sensing during a second portion of the LBT period based on a second energy detection threshold different from the first energy detection threshold; and
   communicating, in the first shared radio frequency band, a communication signal during the MCOT based on the LBT procedure.

2. The method of aspect 1, wherein the first energy detection threshold is lower than the second energy detection threshold.

3. The method of any of aspects 1 or 2, wherein the performing the LBT procedure further comprises:
   identifying a distributed coordination function interframe spacing (DIFS) in the first shared radio frequency band based on the first channel sensing; and
   switching from the first energy detection threshold to the second energy detection threshold for the second channel sensing based on the identifying the DIFS, and
   wherein the second channel sensing is associated with a random backoff.

4. The method of aspect 3, wherein the performing the LBT procedure further comprises:
   switching from the first energy detection threshold to the second energy detection threshold for the second channel sensing further based on the LBT procedure being associated with an additional backoff.

5. The method of aspect 4, wherein the performing the LBT procedure further comprises:
   determining whether to apply the additional backoff to the LBT procedure based on a priority associated with the communication signal.

6. The method of aspect 4, wherein the performing the LBT procedure further comprises:
   performing a preamble detection during at least a portion of the LBT period,
   wherein the additional backoff is associated with the preamble detection.

7. The method of aspect 4, wherein the performing the LBT procedure further comprises:
   performing at least one of the first channel sensing or the second channel sensing based on a synchronization period associated with a synchronous channel access mode, a duration of the MCOT being based on the synchronization period,
   wherein the additional backoff is associated with the synchronous channel access mode.

8. The method of aspect 7, further comprising:
   determining the duration of the MCOT by subtracting the DIFS and the second portion of the LBT period from the synchronization period.

9. The method of aspect 7, wherein the performing the LBT procedure further comprises:
   performing at least one of the first channel sensing or the second channel sensing based on the synchronous channel access mode.

10. The method of aspect 7, wherein the performing the LBT procedure further comprises:
    performing at least one of the first channel sensing or the second channel sensing based on an asynchronous channel access mode; and
    synchronizing the DIFS to the synchronization period.

11. The method of any of aspects 1 or 2, wherein the performing the LBT procedure further comprises:
    switching, in response to a channel busy status from the second channel sensing, from the second energy detection threshold to the first energy detection threshold for third channel sensing; and performing the third channel sensing during a third portion of the LBT period after the second portion of the LBT period based on the first energy detection threshold to identify a DIFS.

12. The method of any of aspects 1 or 2, wherein the performing the LBT procedure further comprises:
performing, in response to a channel busy status from the second channel sensing, third channel sensing during a third portion of the LBT period after the second portion of the LBT period based on the second energy detection threshold to identify a DIFS.

13. The method of aspect 12, wherein the performing the LBT procedure further comprises:
performing the third channel sensing based on the second energy detection threshold is further based on a channel measurement in a DIFS detected from the first channel sensing satisfying a signal level threshold.

14. The method of any of aspects 1 or 2, wherein the performing the LBT procedure further comprises:
performing, in response to a channel busy status from the second channel sensing, third channel sensing during a third portion of the LBT period after the second portion of the LBT period; and
determining whether to perform the third LBT based on the first energy detection threshold or the second energy detection threshold based on a channel access priority.

15. The method of any of aspects 1, 2, or 10, further comprising:
determining a synchronization period associated with synchronous channel access with respect to a starting time of a latest distributed coordination function interframe spacing (DIFS) detected from the LBT procedure; and
determining the MCOT based on the synchronization period.

16. The method of any of aspects 1, 2, or 10, further comprising:
determining a synchronization period associated with synchronous channel access with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and
determining the MCOT based on the synchronization period.

17. The method of aspect 16, wherein the determining the synchronization period comprises at least one of:
determining the synchronization period with respect to the first starting time of the first DIFS in response to a determination that the first channel measurement has a smaller signal value than the second channel measurement; or
determining the synchronization period with respect to the second starting time of the second DIFS in response to a determination that the second channel measurement has a smaller signal value than the first channel measurement.

18. The method of any of aspects 1, 2, or 10, further comprising:
performing third channel sensing in a second shared radio frequency band different from the first shared radio frequency band;
determining a synchronization period with respect to a first starting time of a first distributed coordination function interframe spacing (DIFS) detected from the LBT procedure or a second starting time of a second DIFS detected from the LBT procedure based on a comparison between the first starting time and the second starting time; and
determining the MCOT based on the synchronization period.

19. The method of aspect 18, wherein the determining the synchronization period comprises at least one of:
determining the synchronization period with respect to the first starting time of the first DIFS in response to a determination that the first starting time of the first DIFS is later than the second starting time of the second DIFS; or
determining the synchronization period with respect to the second starting time of the second DIFS in response to a determination that the second starting time of the second DIFS is later than the first starting time of the first DIFS.

20. The method of any of aspects 1, 2, or 10, further comprising:
performing third channel sensing in a second shared radio frequency band different from the first shared radio frequency band;
determining a synchronization period with respect to a first starting time of a first distributed coordination function interframe spacing (DIFS) detected from the LBT procedure or a second starting time of a second DIFS detected from the LBT procedure based on a comparison between a first channel measurement in the first DIFS and a second channel measurement in the second DIFS; and
determining the MCOT based on the synchronization period.

21. The method of aspect 20, wherein the determining the synchronization period comprises at least one of:
determining the synchronization period with respect to the first starting time of the first DIFS in response to a determination that the first channel measurement has a smaller signal value than the second channel measurement; or
determining the synchronization period with respect to the second starting time of the second DIFS in response to a determination that the second channel measurement has a smaller signal value than the first channel measurement.

22. The method of any of aspects 1, 2, or 9, wherein the wireless communication device is a first base station (BS), the method further comprising:
transmitting, to a second BS, a coordination information signal during the MCOT using a first transmit power, the coordination information signal including a parameter associated with the communicating the communication signal in the MCOT, and
wherein the communicating the communication signal comprises: transmitting the communication signal based on a second transmit power different from the first transmit power.

23. The method of aspect 22, wherein the first transmit power is based on the second energy detection threshold, and wherein the second transmit power is based on the second energy detection threshold.

24. The method of aspect 22, wherein the transmitting the coordination information signal comprises:
transmitting, to the second BS, the coordination information signal based on a countdown value associated with the second channel sensing satisfying a threshold.

25. The method of aspect 22, wherein the transmitting the coordination information signal comprises:

transmitting, to the second BS, the coordination information signal based on a countdown value at a beginning the first channel sensing satisfying a threshold and a channel idle period detected from the first channel sensing being a latest detected channel idle period in the LBT procedure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a wireless communication device, comprising:

performing a listen-before-talk (LBT) procedure to contend for a maximum channel occupancy time (MCOT) in a first shared radio frequency band, the performing the LBT comprising:
performing, in the first shared radio frequency band, first channel sensing during a first portion of an LBT period based on a first energy detection threshold;
switching, based on the LBT procedure including an additional backoff, from the first energy detection threshold to a second energy detection threshold, wherein the second energy detection threshold is different from the first energy detection threshold; and
performing, in the first shared radio frequency band based on the first channel sensing, second channel sensing during a second portion of the LBT period based on the second energy detection threshold; and
communicating, in the first shared radio frequency band, a communication signal during the MCOT based on the LBT procedure.

2. The method of claim 1, wherein the first energy detection threshold is lower than the second energy detection threshold.

3. The method of claim 1, wherein the performing the LBT procedure further comprises:
identifying a distributed coordination function interframe spacing (DIFS) in the first shared radio frequency band based on the first channel sensing; and
wherein the second channel sensing is associated with a random backoff.

4. The method of claim 1, wherein the performing the LBT procedure further comprises:
performing the additional backoff.

5. The method of claim 4, wherein the performing the LBT procedure further comprises:
determining to perform the additional backoff based on a priority associated with the communication signal.

6. The method of claim 4, wherein the performing the additional backoff comprises:
performing a preamble detection during at least a portion of the LBT period.

7. The method of claim 4, wherein the performing the LBT procedure further comprises:
performing at least one of the first channel sensing or the second channel sensing based on a synchronization period associated with a synchronous channel access mode, a duration of the MCOT being based on the synchronization period,
wherein the performing the additional backoff is associated with the synchronous channel access mode.

8. The method of claim 1, wherein the performing the LBT procedure further comprises:
performing at least one of the first channel sensing or the second channel sensing based on a synchronous channel access mode.

9. The method of claim 1, wherein the performing the LBT procedure further comprises:
performing at least one of the first channel sensing or the second channel sensing based on an asynchronous channel access mode; and
synchronizing a distributed coordination function interframe spacing (DIFS) to a synchronization period associated with a synchronous channel access mode.

10. The method of claim 1, wherein the performing the LBT procedure further comprises:

switching, in response to a channel busy status from the second channel sensing, from the second energy detection threshold to the first energy detection threshold; and performing third channel sensing during a third portion of the LBT period after the second portion of the LBT period based on the first energy detection threshold to identify a DIFS.

11. The method of claim 1, further comprising:
determining a synchronization period associated with synchronous channel access with respect to a starting time of a latest distributed coordination function interframe spacing (DIFS) detected from the LBT procedure; and
determining the MCOT based on the synchronization period.

12. The method of claim 1, wherein the wireless communication device is a first base station (BS), the method further comprising:
transmitting, to a second BS, a coordination information signal during the MCOT using a first transmit power, the coordination information signal including a parameter associated with the communicating the communication signal in the MCOT, and
wherein the communicating the communication signal comprises:
transmitting the communication signal based on a second transmit power different from the first transmit power.

13. The method of claim 12, wherein the first transmit power is based on the second energy detection threshold, and wherein the second transmit power is based on the first energy detection threshold.

14. An apparatus comprising:
a processor; and
a transceiver in communication with the processor, wherein the apparatus is configured to:
perform a listen-before-talk (LBT) procedure to contend for a maximum channel occupancy time (MCOT) in a first shared radio frequency band by:
performing, in the first shared radio frequency band, first channel sensing during a first portion of an LBT period based on a first energy detection threshold;
switching, based on the LBT procedure including an additional backoff, from the first energy detection threshold to a second energy detection threshold, wherein the second energy detection threshold is different from the first energy detection threshold; and
performing, in the first shared radio frequency band based on the first channel sensing, second channel sensing during a second portion of the LBT period based on the second energy detection threshold; and
communicate, in the first shared radio frequency band, a communication signal during the MCOT based on the LBT procedure.

15. The apparatus of claim 14, wherein the first energy detection threshold is lower than the second energy detection threshold.

16. The apparatus of claim 14, wherein the apparatus is further configured to perform the LBT procedure by:
identifying a distributed coordination function interframe spacing (DIFS) in the first shared radio frequency band based on the first channel sensing; and
wherein the second channel sensing is associated with a random backoff.

17. The apparatus of claim 14, wherein the apparatus is further configured to: perform the additional backoff.

18. The apparatus of claim 17, wherein the apparatus is further configured to:
determine whether to apply the additional backoff to the LBT procedure based on a priority associated with the communication signal.

19. The apparatus of claim 17, wherein the apparatus is further configured to perform the LBT procedure by:
performing at least one of the first channel sensing or the second channel sensing based on a synchronization period associated with a synchronous channel access mode, a duration of the MCOT being based on the synchronization period,
wherein the additional backoff is associated with the synchronous channel access mode.

20. The apparatus of claim 14, wherein the apparatus is further configured to perform the LBT procedure by:
performing at least one of the first channel sensing or the second channel sensing based on a synchronous channel access mode.

21. The apparatus of claim 14, wherein the apparatus is further configured to perform the LBT procedure by:
switching, in response to a channel busy status from the second channel sensing, from the second energy detection threshold to the first energy detection threshold; and
performing third channel sensing during a third portion of the LBT period after the second portion of the LBT period based on the first energy detection threshold to identify a DIFS.

22. The apparatus of claim 14, wherein the apparatus is further configured to:
determine a synchronization period associated with synchronous channel access with respect to a starting time of a latest distributed coordination function interframe spacing (DIFS) detected from the LBT procedure; and
determine the MCOT based on the synchronization period.

23. The apparatus of claim 14, wherein the apparatus is a first base station (BS), and wherein the first BS is further configured to:
transmit, to a second BS, a coordination information signal during the MCOT using a first transmit power, the coordination information signal including a parameter associated with the communication signal in the MCOT, and
transmit the communication signal based on a second transmit power different from the first transmit power.

24. The apparatus of claim 23, wherein the first transmit power is based on the second energy detection threshold, and wherein the second transmit power is based on the first energy detection threshold.

25. A non-transitory computer-readable medium having program code recorded thereon, the program code comprising:
code for causing a wireless communication device to perform a listen-before-talk (LBT) procedure to contend for a maximum channel occupancy time (MCOT) in a first shared radio frequency band, the code for causing the wireless communication device to perform the LBT procedure is configured to cause the wireless communication device to:
perform, in the first shared radio frequency band, first channel sensing during a first portion of an LBT period based on a first energy detection threshold;
switch, based on the LBT procedure including an additional backoff, from the first energy detection threshold to a second energy detection threshold, wherein the second energy detection threshold is different from the first energy detection threshold; and perform, in the first shared radio frequency band based on the first channel sensing, second channel sensing during a second portion of the LBT period based on the second energy detection threshold; and code for causing the wireless communication device to communicate, in the first shared radio frequency band, a communication signal during the MCOT based on the LBT procedure.

26. The non-transitory computer-readable medium of claim 25, wherein the first energy detection threshold is lower than the second energy detection threshold, wherein the code for causing the wireless communication device to perform the LBT procedure is further configured to cause the wireless communication device to:

identify a distributed coordination function interframe spacing (DIFS) in the first shared radio frequency band based on the first channel sensing; and wherein the second channel sensing is associated with a random backoff.

27. The non-transitory computer-readable medium of claim 25, wherein the code for causing the wireless communication device to perform the LBT procedure further comprises:

code for causing the wireless communication device to perform the additional backoff.

28. An apparatus comprising:

means for performing a listen-before-talk (LBT) procedure to contend for a maximum channel occupancy time (MCOT) in a first shared radio frequency band, the means for performing the LBT procedure configured to:

perform, in the first shared radio frequency band, first channel sensing during a first portion of an LBT period based on a first energy detection threshold;

switch, based on the LBT procedure including an additional backoff, from the first energy detection threshold to a second energy detection threshold, wherein the second energy detection threshold is different from the first energy detection threshold; and perform, in the first shared radio frequency band based on the first channel sensing, second channel sensing during a second portion of the LBT period based on the second energy detection threshold; and means for communicating, in the first shared radio frequency band, a communication signal during the MCOT based on the LBT procedure.

29. The apparatus of claim 28, wherein the first energy detection threshold is lower than the second energy detection threshold, wherein the means for performing the LBT procedure is further configured to:

identify a distributed coordination function interframe spacing (DIFS) in the first shared radio frequency band based on the first channel sensing; and wherein the second channel sensing is associated with a random backoff.

30. The apparatus of claim 28, wherein the means for performing the LBT procedure comprises:

means for performing the additional backoff.

31. The method of claim 4, wherein the performing the additional backoff comprises:

performing channel sensing based on a synchronous channel access during at least a portion of the LBT period.

32. The method of claim 4, wherein the performing the additional backoff comprises:

performing channel sensing based on a cooperative asynchronous channel access during at least a portion of the LBT period.

33. The apparatus of claim 17, wherein the apparatus is configured to perform the additional backoff by at least one of:

performing a preamble detection during at least a portion of the LBT period;

performing channel sensing based on a synchronous channel access during at least a portion of the LBT period; or performing channel sensing based on a cooperative asynchronous channel access during at least a portion of the LBT period.

34. The non-transitory computer-readable medium of claim 27, wherein the code for causing the wireless communication device to perform the additional backoff comprises at least one of:

code for causing the wireless communication device to perform a preamble detection during at least a portion of the LBT period;

code for causing the wireless communication device to perform channel sensing based on a synchronous channel access during at least a portion of the LBT period; or code for causing the wireless communication device to perform channel sensing based on a cooperative asynchronous channel access during at least a portion of the LBT period.

35. The apparatus of claim 30, wherein the means for performing the additional backoff comprises at least one of:

means for performing a preamble detection during at least a portion of the LBT period;

means for performing channel sensing based on a synchronous channel access during at least a portion of the LBT period; or means for performing channel sensing based on a cooperative asynchronous channel access during at least a portion of the LBT period.

* * * * *